US 9,453,566 B2

(12) United States Patent
Loeffler et al.

(10) Patent No.: US 9,453,566 B2
(45) Date of Patent: Sep. 27, 2016

(54) HYDROMECHANICAL TRANSMISSION WITH DOUBLE SUMP GEAR UNIT HOUSING

(71) Applicant: Parker-Hannifin Corporation, Cleveland, OH (US)

(72) Inventors: John Loeffler, Sun City Center, FL (US); Daniel Paisley, Lexington, KY (US); Nabil Imam, Louisville, KY (US); Matthew Rommel, Independence, KY (US)

(73) Assignee: Parker-Hannifin Corporation, Cleveland, OH (US)

( * ) Notice: Subject to any disclaimer, the term of this patent is extended or adjusted under 35 U.S.C. 154(b) by 12 days.

(21) Appl. No.: 14/529,249

(22) Filed: Oct. 31, 2014

(65) Prior Publication Data

US 2015/0057120 A1   Feb. 26, 2015

Related U.S. Application Data

(63) Continuation of application No. PCT/US2013/023104, filed on Jan. 25, 2013.

(60) Provisional application No. 61/641,467, filed on May 2, 2012.

(51) Int. Cl.

| F16H 47/04 | (2006.01) |
| F16D 1/06 | (2006.01) |
| F16H 61/44 | (2006.01) |
| F16D 1/10 | (2006.01) |

(52) U.S. Cl.
CPC ............. *F16H 47/04* (2013.01); *F16D 1/06* (2013.01); *F16H 61/44* (2013.01); *B60Y 2304/07* (2013.01); *F16D 2001/103* (2013.01); *F16H 2047/045* (2013.01); *Y10T 29/49464* (2015.01); *Y10T 403/7026* (2015.01)

(58) Field of Classification Search
CPC ........................................................ F16H 47/04
See application file for complete search history.

(56) References Cited

U.S. PATENT DOCUMENTS

| 5,222,921 A | 6/1993 | Garcia |
| 5,766,107 A * | 6/1998 | Englisch ................. F16H 47/04 |
| | | 475/80 |

(Continued)

FOREIGN PATENT DOCUMENTS

EP     0059055 A2    9/1982

OTHER PUBLICATIONS

Patent Cooperation Treaty, International Search Report and Written Opinion for Application No. PCT/US2013/023104, filed Jan. 25, 2013, mailed Mar. 21, 2013, European Patent Office, Netherlands.

*Primary Examiner* — Derek D Knight
(74) *Attorney, Agent, or Firm* — Robert J. Clark

(57) ABSTRACT

A hydromechanical transmission 11 includes a hydraulic unit 23 and a gear unit 24. The gear unit 24 includes a first gear unit housing 29a defining a first sump 37a having a first set of gears 71. A second gear unit housing 29b defines a substantially smaller second sump 37b having a second set of gears 78, 79. An input shaft 62 extends longitudinally into the first sump 37a, and an output shaft 63 extends longitudinally from the second sump 37b. The longitudinal axes of the input and output shafts are substantially coaxial. A first hydraulic pump motor unit drive shaft 44 extends into the first sump 37a and is drivingly connected with the first set of gears, and a second hydraulic pump motor unit drive shaft 45 extends through the first sump 37a and into the second sump 37b and is drivingly connected with the second set of gears.

20 Claims, 16 Drawing Sheets

(56) References Cited

U.S. PATENT DOCUMENTS

2010/0051410 A1* 3/2010 Iwaki .................. F16H 47/04 475/159

2011/0100732 A1* 5/2011 Bailly .................. F16H 47/04 475/296

* cited by examiner

HYDROMECHANICAL TRANSMISSION WITH DOUBLE SUMP GEAR UNIT HOUSING

CROSS REFERENCE TO RELATED APPLICATIONS

The present patent application is a Continuation of PCT/US2013/023104, filed on Jan. 25, 2013, which claims the benefit of U.S. Provisional Patent Application Ser. No. 61/641,467 filed May 2, 2012, the disclosures of which are incorporated herein by reference in entirety.

TECHNICAL FIELD

This invention relates generally to a hydromechanical transmission, and more specifically to a hydromechanical powersplit transmission for a hydraulic hybrid vehicle, and to components and assemblies and methods that may be used with such transmissions and elsewhere.

BACKGROUND OF THE INVENTION

Hydromechanical transmissions, including hydromechanical powersplit transmissions, are used in hydraulic hybrid vehicles. Such vehicles may include a vehicle prime mover such as an internal combustion engine, at least one hydraulic pump motor unit, a gear set such as a planetary gear set, and an output shaft connecting the planetary gear set to a drive shaft of the vehicle. The internal combustion engine and the hydraulic pump motor unit are connected to the gear set, and the gear set splits power from the internal combustion engine and from the hydraulic pump motor unit in a motoring mode to rotate the drive shaft and propel the vehicle. The pump motor unit may also be used in a pumping mode to capture energy under certain conditions such as braking the vehicle, and the captured energy may be stored in an energy storage device such as a hydraulic accumulator to power the hydraulic pump motor unit in the motoring mode.

Various prior art configurations for hydromechanical powersplit vehicle transmissions may be used in off-highway vehicle applications such as agricultural tractors and wheel loaders or in on-highway applications such as delivery trucks. The ability of the powersplit transmission to provide infinitely variable speed allows the engine to run at its optimum efficiency conditions, while transmission of most power through the mechanical power path rather than through the hydraulic power path may result in relatively high transmission efficiency when hydraulic power is limited or not being used. Smooth and seamless control with uninterrupted transfer of torque from the prime mover and/or the hydraulic pump motor unit to the vehicle drive shaft may result in good performance when compared to manual and automatic transmissions having discrete gear ratios, while elimination of a hydrodynamic torque converter may help achieve efficiency when compared to automatic transmissions.

In transmissions of this type, and in hydromechanical components and assemblies and methods for use in such transmissions and elsewhere, technical problems include difficulties with system complexity, efficiency, size, weight, flexibility, lubrication of components, sump oil fill levels and heat build-up, assembly, repair, transmission of forces and torque in relatively large weight vehicles, and parking lock requirements. More specifically, these technical problems include alignment with other components of a vehicle such as the prime mover engine and the differential, ease of assembly, ease of installation in a vehicle and removal from the vehicle, space availability of the vehicle, space requirements of the transmission and within the transmission, weight of the transmission, smooth operation, transmission control, ease of disassembly and repair, and flexibility to change for use in a variety of different vehicles and different applications. Still more specifically, these technical problems include difficulty assembling and attaching and integrating the hydraulic components, including the hydraulic pump motor units and the controls and drive shafts for the hydraulic pump motor units and the hydraulic flow passages and ports for the hydraulic pump motor units, with the planetary gear set, including the drive gears and planetary gear set components, and assembling those components to the prime mover and differential of the vehicle. Further technical problems include lubrication of gear components, including size and complexity and efficiency of lubrication fluid pumps, and assembly and alignment of spline connections. Further technical problems include complexity of, and forces and stresses imposed on, parking lock mechanisms in relatively large weight vehicles.

SUMMARY OF THE INVENTION

The present invention addresses certain of the aforementioned technical problems and provides a hydromechanical vehicle transmission and assemblies for use in such transmissions and elsewhere. The transmission and assemblies according to the present invention may be used in a motor vehicle in place of a conventional manual or automatic transmission, connected directly to a conventional vehicle prime mover engine drive shaft and differential drive shaft, and situated between typical vehicle frame rails, while providing a configuration that is modular, compact, and capable of kinetic brake energy recovery, with good efficiency.

Still more specifically, the invention provides a gear unit having a double sump for use in a hydromechanical transmission and elsewhere. The double sump includes different gear components of the gear unit that are assembled and arranged in different ones of the two sumps, to facilitate assembly and to minimize space requirements. The double sump further includes primary and secondary hydraulic pump motor unit drive shafts that drivingly engage the different gear components in the different ones of the sumps and that are supported by bearings in the walls of the sumps. The double sump further allows different lubricating fluid fill levels to be used in the two sumps having rotating gears, to avoid inefficiencies and heat build-up created by rotating a vertically lower gear submerged in the lubricating fluid.

According to one embodiment of the invention, a first gear unit housing and a second gear unit housing have walls that are connected together. The walls of the first housing define a first sump, and the walls of the second housing define a second sump. A first set of rotatable gears is disposed in the first sump, and a second set of rotatable gears is disposed in the second sump. Each of the sets of rotatable gears includes at least two gears. An input drive shaft extends longitudinally into the first sump and is rotatably connected to the first set of rotatable gears, and an output drive shaft extends longitudinally out of the second sump and is rotatably connected to the second set of gears. The longitudinal axes of the input and output drive shafts are substantially coaxial.

First and second hydraulic pump motor unit drive shafts extend longitudinally into the first sump, and the first hydraulic pump motor unit drive shaft is rotatably supported by a bearing in a wall of the first sump. The second hydraulic pump motor unit drive shaft extends longitudinally through the first sump and into the second sump, and the second hydraulic pump motor unit drive shaft is supported by a bearing in a wall of the first sump and by a bearing in a wall of the second sump. The first hydraulic pump motor unit drive shaft is driving connected to the first set of rotatable gears in the first sump, and the second hydraulic pump motor unit drive shaft is drivingly connected to the second set of rotatable gears in the second sump. At least one wall of the first and second housings is a common wall that defines the first sump and the second sump, and the longitudinal axes of the input shaft and output shaft extend through the common wall.

The lubricating liquid fill levels in the two sumps are substantially equal when the second gear set is stationary. When the second gear set is rotating, the second sump fill level is substantially lower than the first sump fill level. The volume of liquid lubricant in the second sump is substantially less than, and preferably no greater than about 30% of, the volume of lubricant in the first sump when the second gear set is in its stationary condition. This relatively small volume of lubricant in the second sump relative to that in the first sump allows transferring most of the lubricant from the second sump to the first sump during gear rotation, so that the transferred volume does not fill the first sump to too high a level.

The invention further provides the combinations set out in the accompanying claims. This Summary is not intended to identify key features or essential features of the claimed subject matter, and these and other features of the invention are more fully described and particularly pointed out in the description and claims set out below. The following description and claims and the annexed drawings set forth in detail certain illustrative embodiments of the invention, and these embodiments indicate but a few of the various ways in which the principles of the invention may be used.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
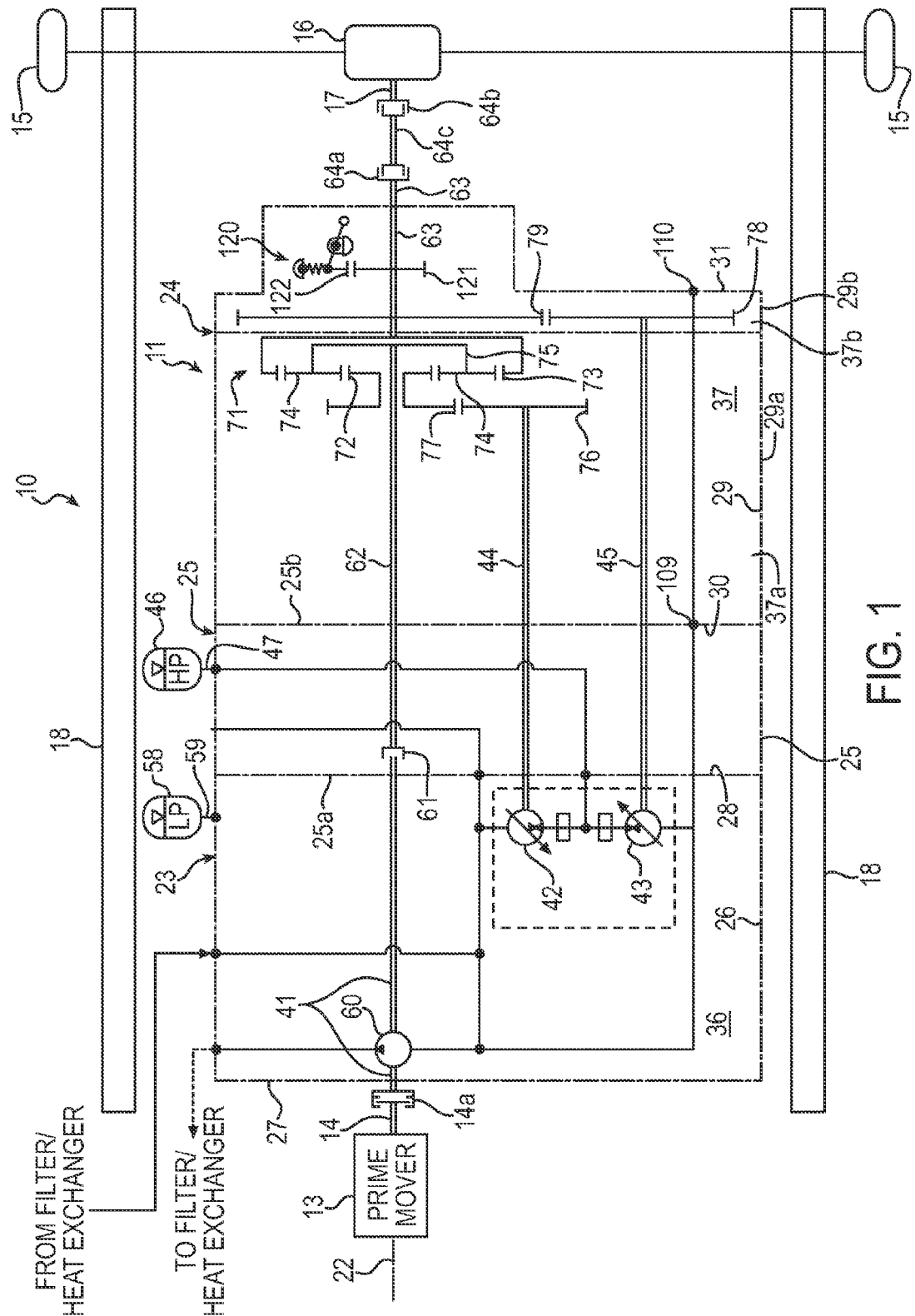
FIG. 1 is a schematic diagram of a wheeled land vehicle that includes a hydromechanical powersplit transmission according to a preferred embodiment of the present invention.

Referring now to the drawings in greater detail, FIGS. 1-16 illustrate an object 10 having a compact hydromechanical powersplit transmission 11 according to a preferred embodiment of the present invention and a method of assembly 140 according to a preferred embodiment of the present invention.

Headings are provided in the description below to assist the reader. However, descriptions under all headings relate to the descriptions under each individual heading, so that the complete description below is to be used to understand the description under each individual heading.

Overall Structure and Operation

The object 10 can be any object that uses a transmission for transmitting energy or converting energy to rotational movement. In the preferred embodiment described below, the object 10 is a wheeled land vehicle such as an on-highway truck. The vehicle 10 includes a prime mover 13, which in the preferred embodiment is a conventional internal combustion engine such as a gasoline or diesel or natural gas engine, and an engine drive shaft 14. The vehicle 10 further includes drive wheels 15, a differential 16, and a differential drive shaft 17. The vehicle 10 also includes frame rails 18, which are longitudinally extending beams, which may be steel or other suitable structural material, to which the body (not shown), prime mover 13, drive shaft 14, vehicle suspension components (not shown), differential 16 and other components of the vehicle 10 are mounted in a conventional well know manner.

Figure 3:
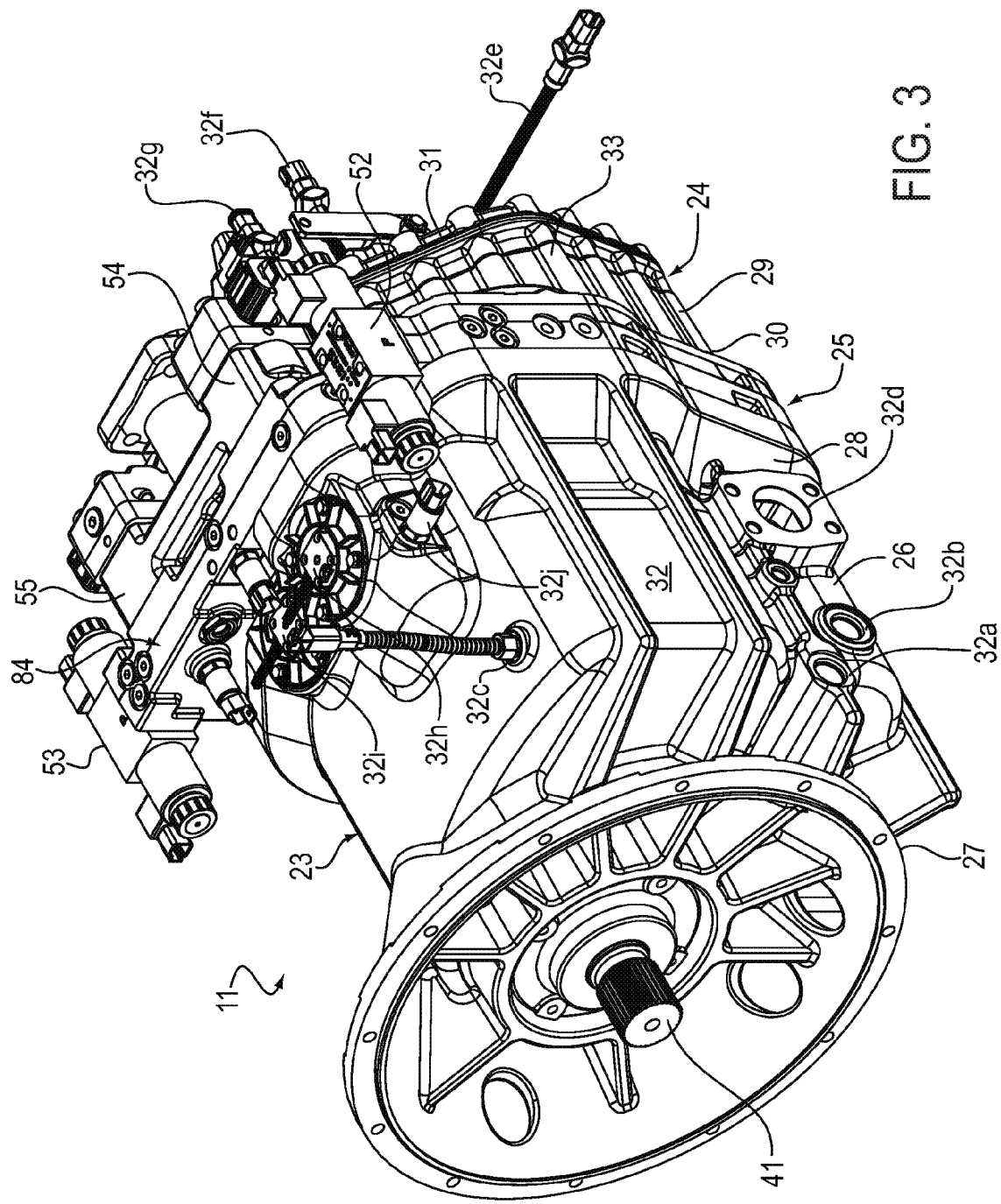
FIG. 3 is a perspective view of the hydromechanical powersplit transmission illustrated schematically in FIG. 1, as viewed from the front driver side of the vehicle in which the transmission is installed.
Figure 7:
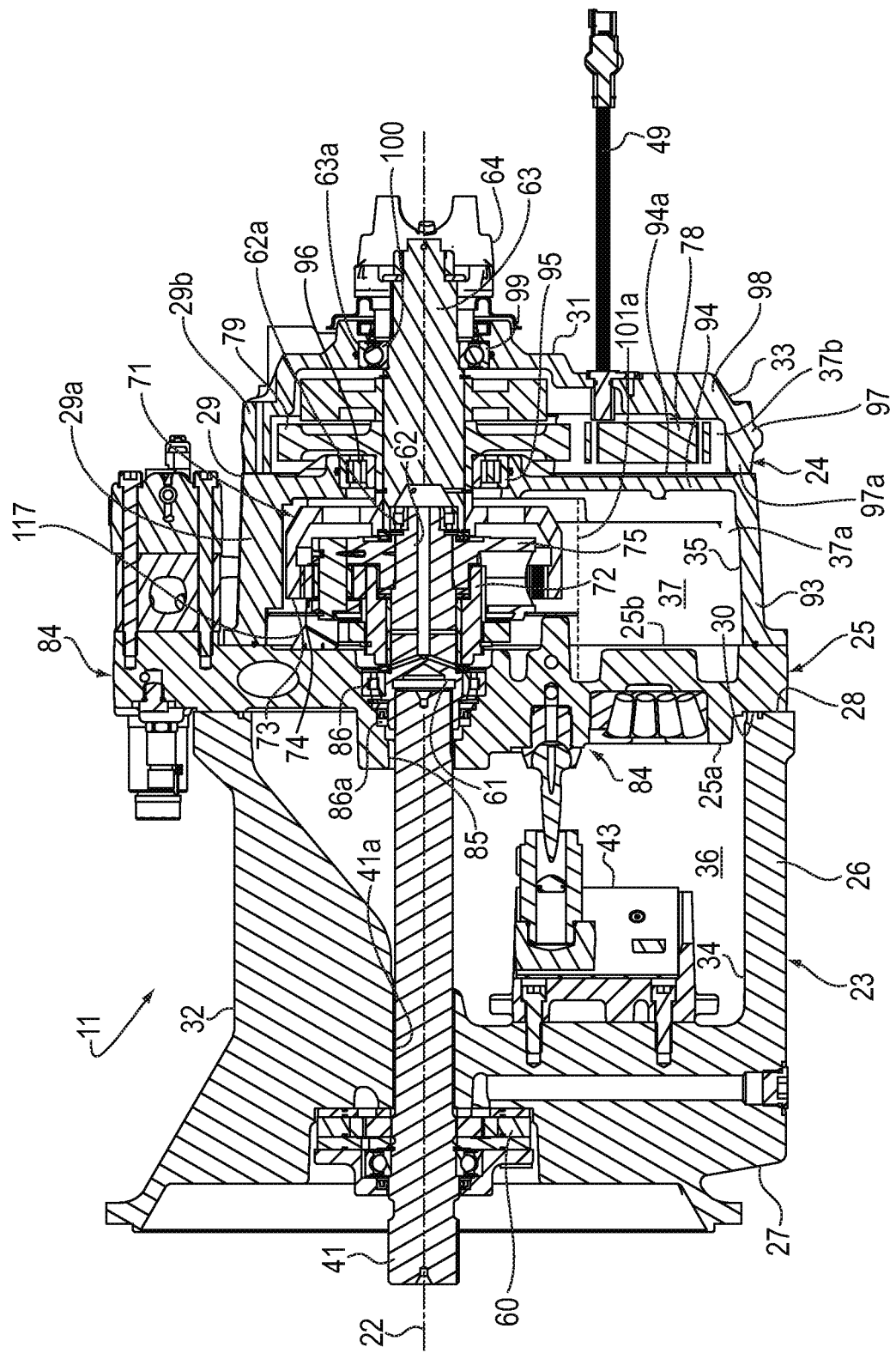
FIG. 7 is a cross sectional view taken along plane 7-7 in FIG. 6.

As best shown in FIGS. 1, 3, and 7, the hydromechanical powersplit transmission 11 has a longitudinal axis 22. The transmission 11 includes a hydraulic unit 23, a gear unit or planetary gear unit 24 that is integral with the hydraulic unit 23, and a connecting plate 25 disposed intermediate the hydraulic unit 23 and the gear unit 24. As used herein, the term integral means two or more functionally different cooperating devices that are assembled without externally exposed fluid or mechanical connections and used as a whole such that each device is an essential part to complete the other. The hydraulic unit 23 includes a hydraulic unit housing 26 having a vehicle prime mover input end 27 and an output end 28. The gear unit 24 includes a gear unit housing or planetary gear unit housing 29 having an input end 30 and an output end 31. The housings 26 and 29 include exterior surfaces 32 and 33 and interior surfaces 34 and 35, respectively. Interior surfaces 34 and 35 cooperate with connecting plate 25 to define chambers 36 and 37, respectively, that are sealed from one another and from the exterior surfaces 32 and 33. The chambers 36 and 37 are in longitudinally aligned relationship to one another along longitudinal axis 22. Various low pressure hydraulic connections through the chamber 36 are illustrated schematically in FIG. 1 with solid lines. It should be understood that these illustrated solid lines are not separate hydraulic conduits, but rather schematically illustrate hydraulic connections that occur between various components through the low pressure hydraulic fluid within chamber 36.

Figure 4:
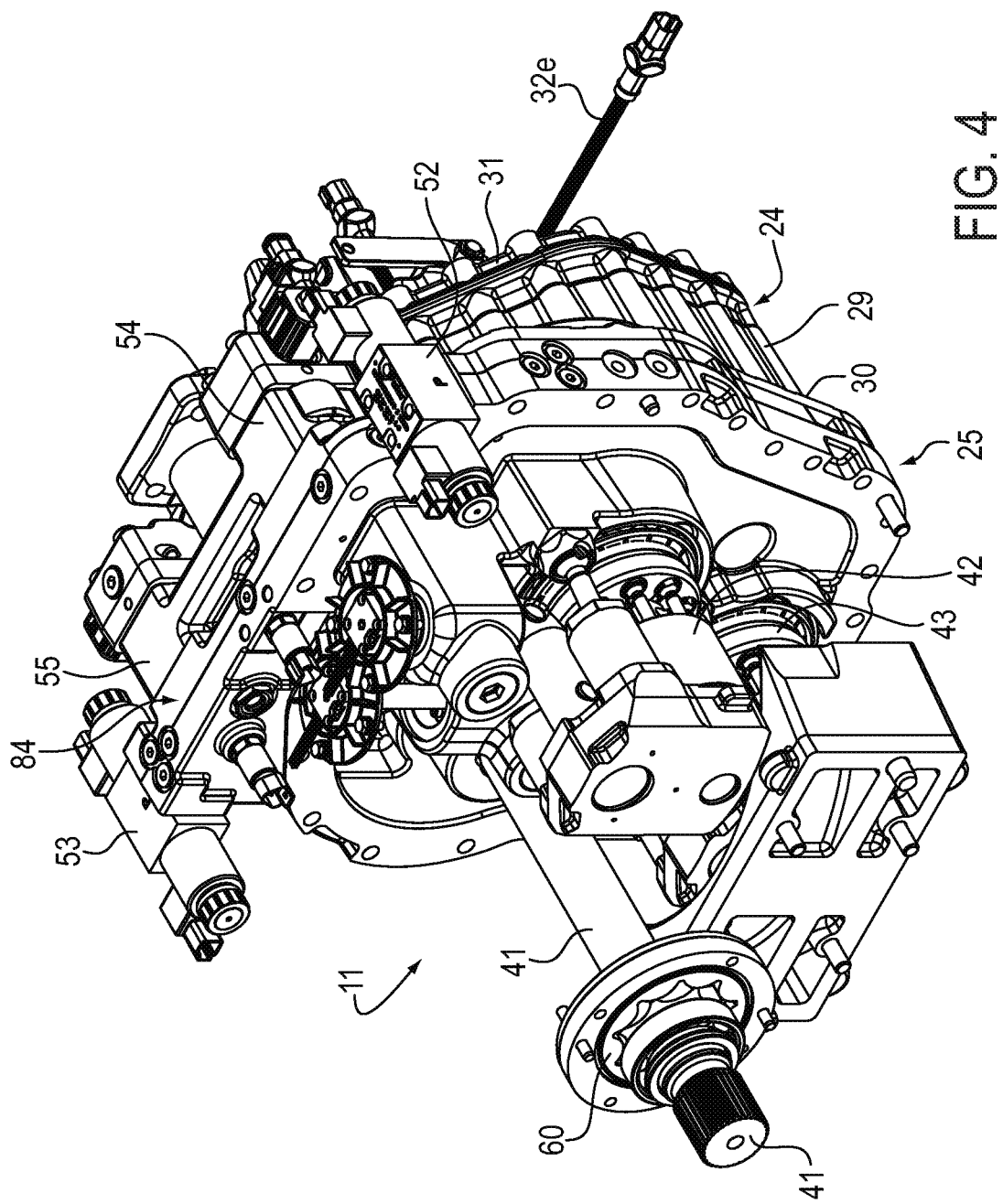
FIG. 4 is a perspective view of the transmission illustrated in FIG. 1, similar to FIG. 3 but having a hydraulic unit housing removed from a central connecting plate.
Figure 5:
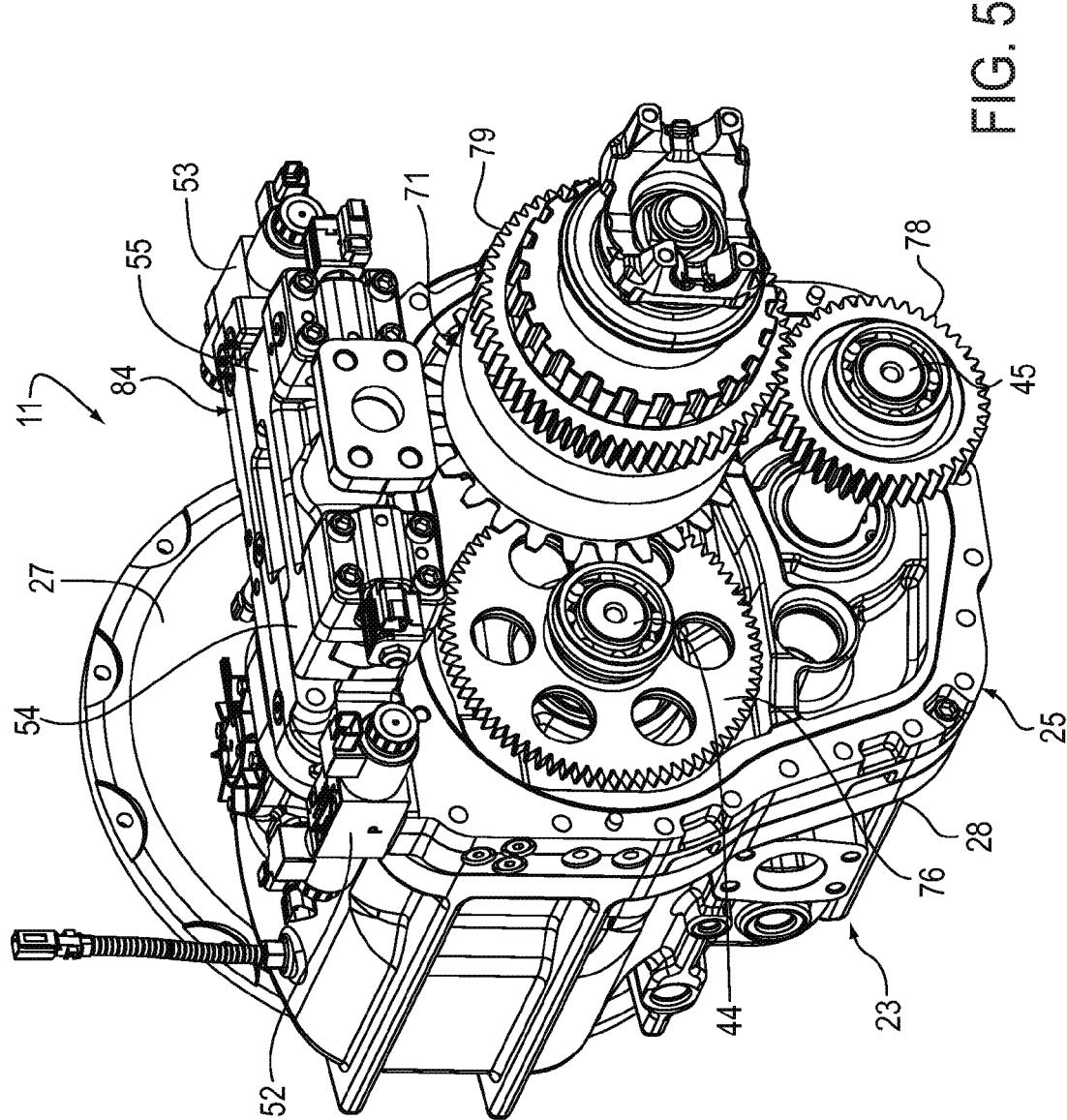
FIG. 5 is another perspective view of the transmission illustrated in FIG. 1, as viewed from the rear driver side of the vehicle in which the transmission is installed, but having a planetary gear unit housing removed from the central connecting plate and having the planetary gear unit gears illustrated.
Figure 6:
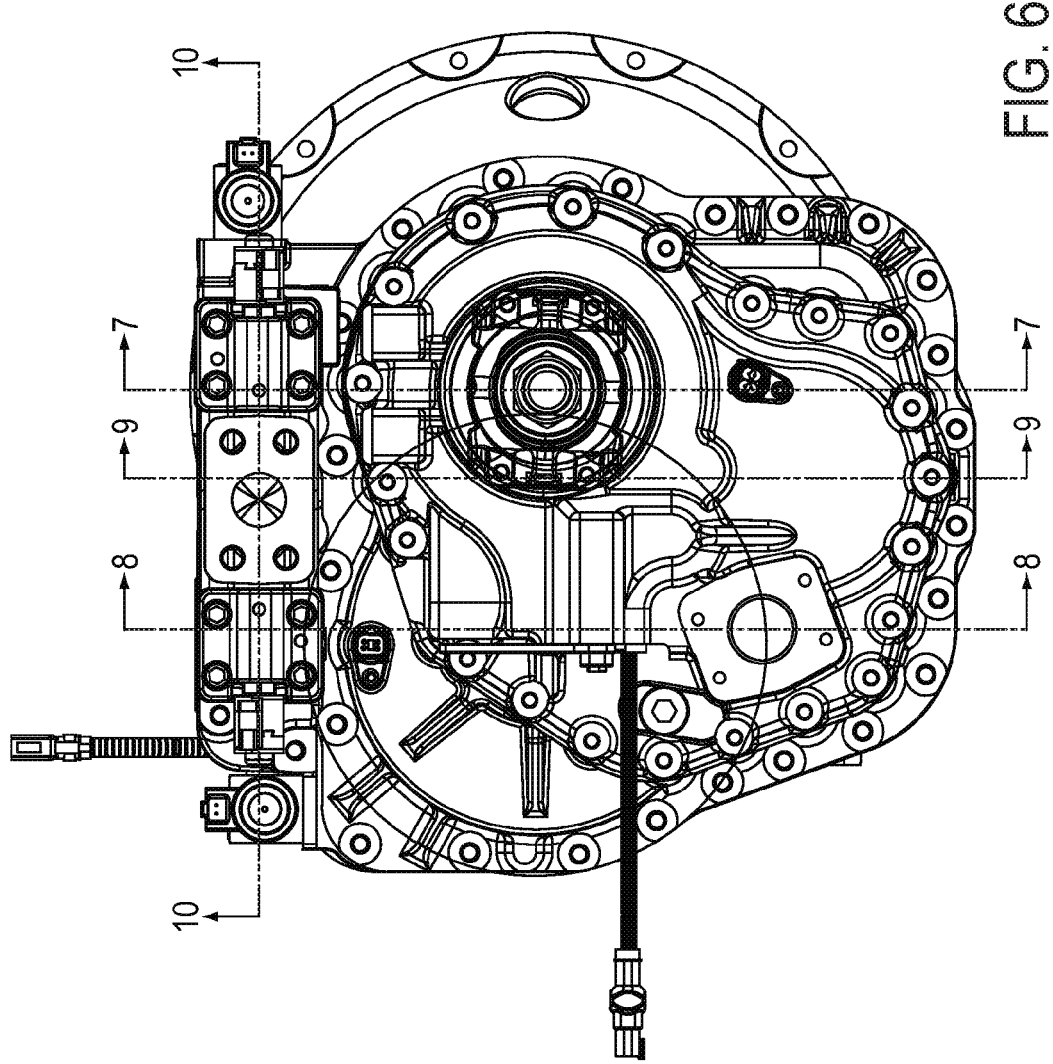
FIG. 6 is a rear or output end view of the transmission illustrated in FIG. 1.
Figure 8:
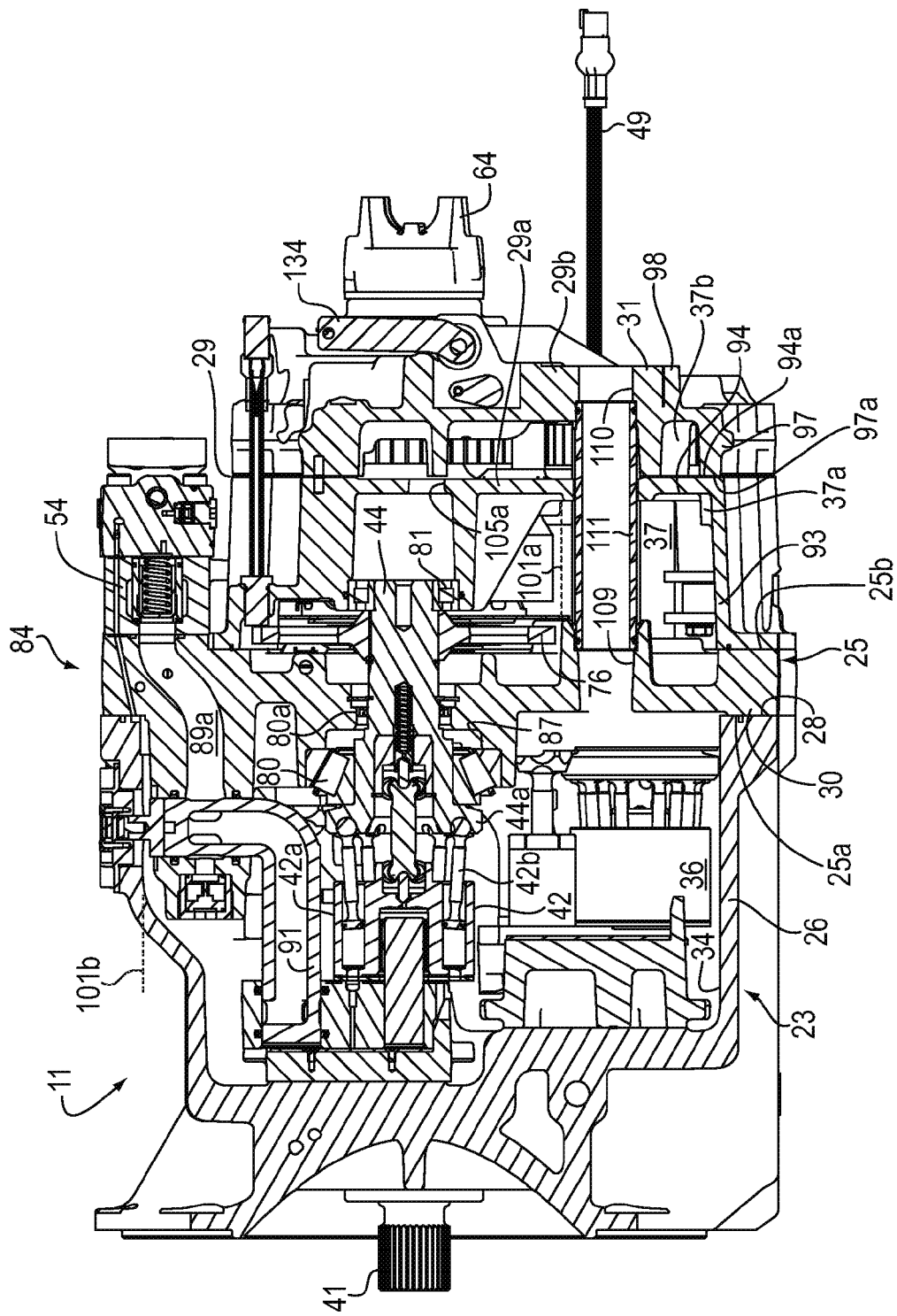
FIG. 8 is a cross sectional view taken along plane 8-8 in FIG. 6.

The hydraulic unit housing 26 includes a longitudinally extending prime mover input shaft or mechanical drive shaft 41 connected to engine drive shaft 14 through a suitable torsional vibration dampening coupling 14a. Input shaft 41 (FIGS. 1 and 7) extends through an input shaft opening 41a at the input end 27, longitudinally into and through the hydraulic unit housing interior chamber 36. The input shaft 41 is rotatably connected to the prime mover 13, so that the prime mover 13 drives the input shaft 41 and causes the input shaft 41 to rotate when the prime mover 13 is running. The term rotatably connected means that components rotate together or are drivingly connected. A primary hydraulic pump motor unit 42 and a secondary hydraulic pump motor unit 43 (FIGS. 1, 8 and 9) are disposed within the chamber 36 in laterally offset spaced relation to the input shaft 41 and in circumferentially spaced relation to one another. This laterally offset relationship of the units 42 and 43 to the input shaft 41, as further described below, allows the input shaft 41 to extend longitudinally through the hydraulic unit housing interior chamber 36 and into connecting plate 25 without interruption. Further, as illustrated in FIGS. 4 and 8, the pump motor units 42 and 43 are longitudinally offset from one another, with the pump motor unit 43 including its barrel and pistons described below being closer to the connecting plate 25 and gear unit 24 than the pump motor unit 42, to reduce the lateral dimension of the transmission 11. The units 42 and 43 in the preferred embodiment are identical and are preferably bent axis, variable displacement, axial piston type pump motor units of the type disclosed in World Intellectual Property Organization publication number WO 2012/016240 A2, the disclosure of which is incorporated herein by reference. Alternatively, the size, displacement or type of the pump motor units 42 and 43 may be different from one another and/or may be different from that illustrated in the preferred embodiment. For example, primary pump motor unit 42 may be a smaller displacement unit than secondary unit 43. For brevity, the detailed structure and operation of the pump motor units 42 and 43 as disclosed in the referenced publication are not repeated in detail herein.

Figure 9:
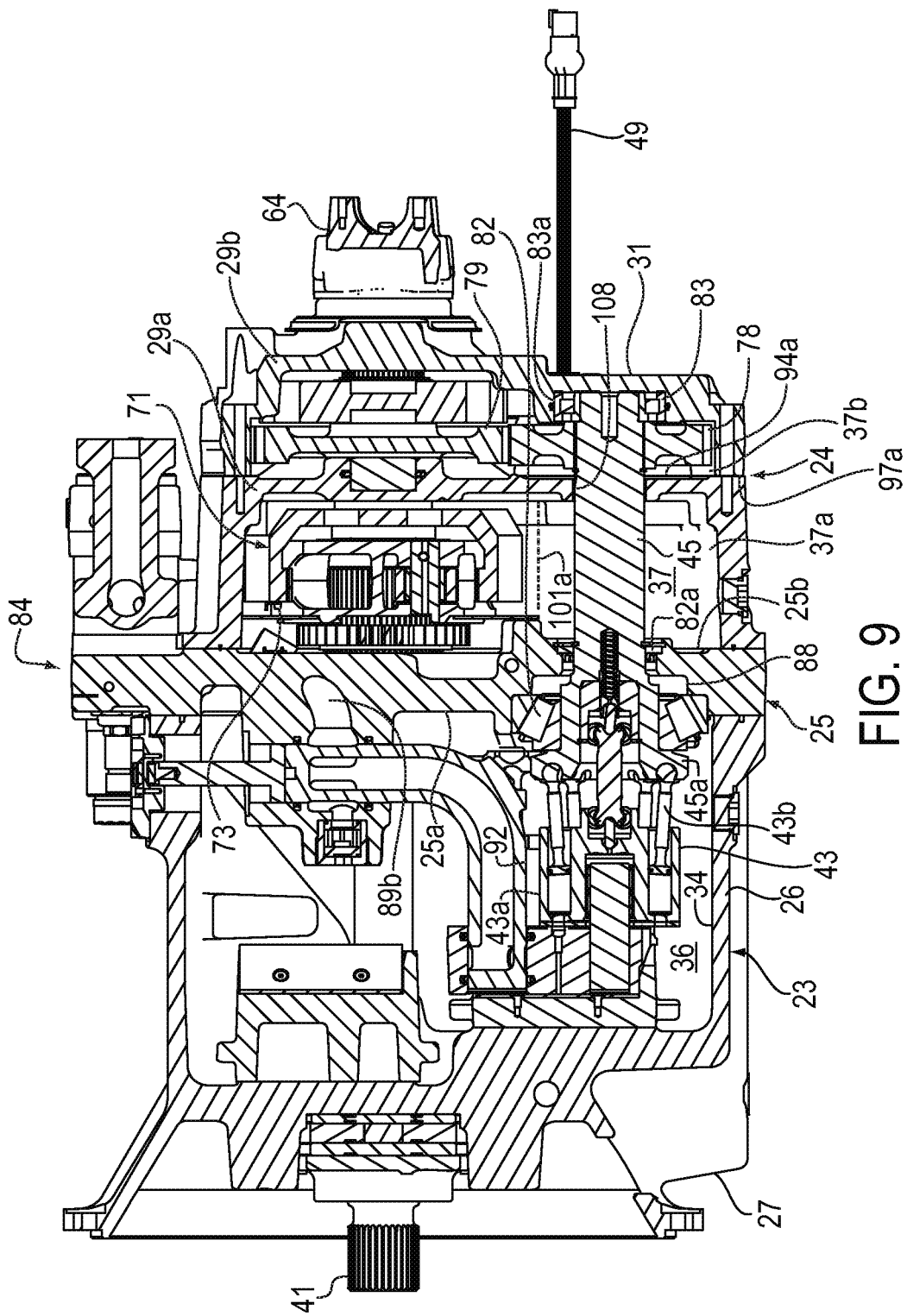
FIG. 9 is a cross sectional view taken along plane 9-9 in FIG. 6.
Figure 10:
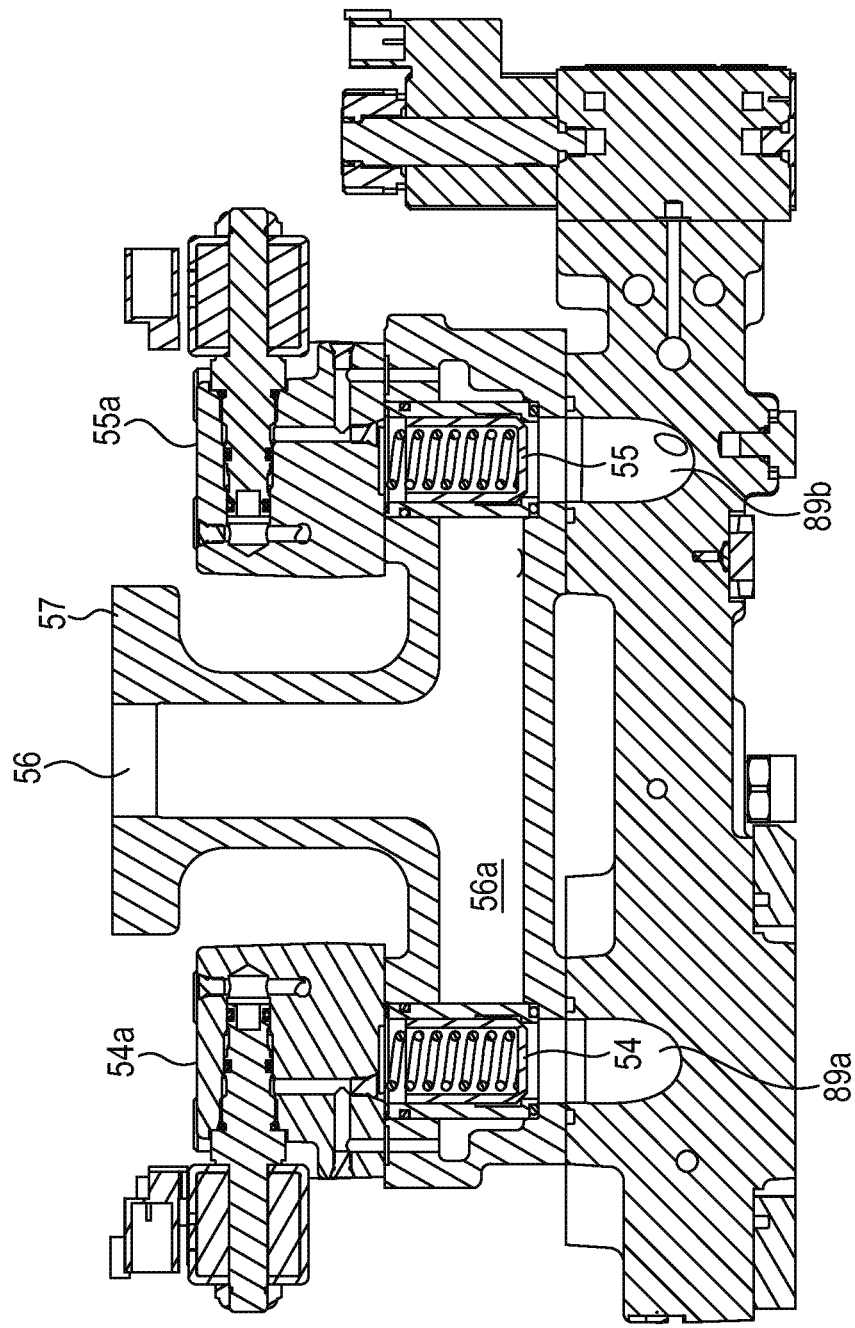
FIG. 10 is a cross sectional view taken along plane 10-10 in FIG. 6.

Primary pump motor unit 42 includes a barrel 42a and pistons 42b, and secondary pump motor unit 43 includes a barrel 43a and pistons 43b. The pump motor units 42 and 43 each operate in a pumping mode or in a motoring mode during the operation of the transmission 11, as further described below. The primary pump motor unit 42 is drivingly connected to primary pump motor unit drive shaft 44 (FIGS. 1 and 8), and the secondary pump motor unit 43 is drivingly connected to secondary pump motor unit drive shaft 45 (FIGS. 1 and 9). The primary shaft 44 includes an integral annular head portion having sockets 44a for its associated pistons 42a, and the pistons 42a and associated barrel 42b provide a rotating group for the primary unit 42. The secondary shaft 45 includes an integral annular head portion having sockets 45a for its associated pistons 43a, and the pistons 43a and associated barrel 42b provide a rotating group for the secondary unit 43. During the pumping mode, the units 42 and/or 43 are driven by primary pump motor unit drive shaft 44 and secondary pump motor unit drive shaft 45, respectively, to pump hydraulic fluid under pressure into a high pressure accumulator 46 (FIG. 1) through a hydraulic line 47 to store energy. During the motoring mode, high pressure hydraulic fluid is supplied to the units 42 and/or 43 from high pressure accumulator 46 through hydraulic line 47 to rotate the shafts 44 and 45 to convert stored energy from accumulator 46 to rotational movement. The primary and secondary pump motor unit drive shafts 44 and 45 are also disposed in radially offset relation to the prime mover input shaft 41 and in circumferentially and longitudinally spaced relation relative to one another. The high pressure accumulator 46 may be mounted remotely to the vehicle frame rails 18, or alternatively may be mounted directly to the transmission 11.

Figure 2:
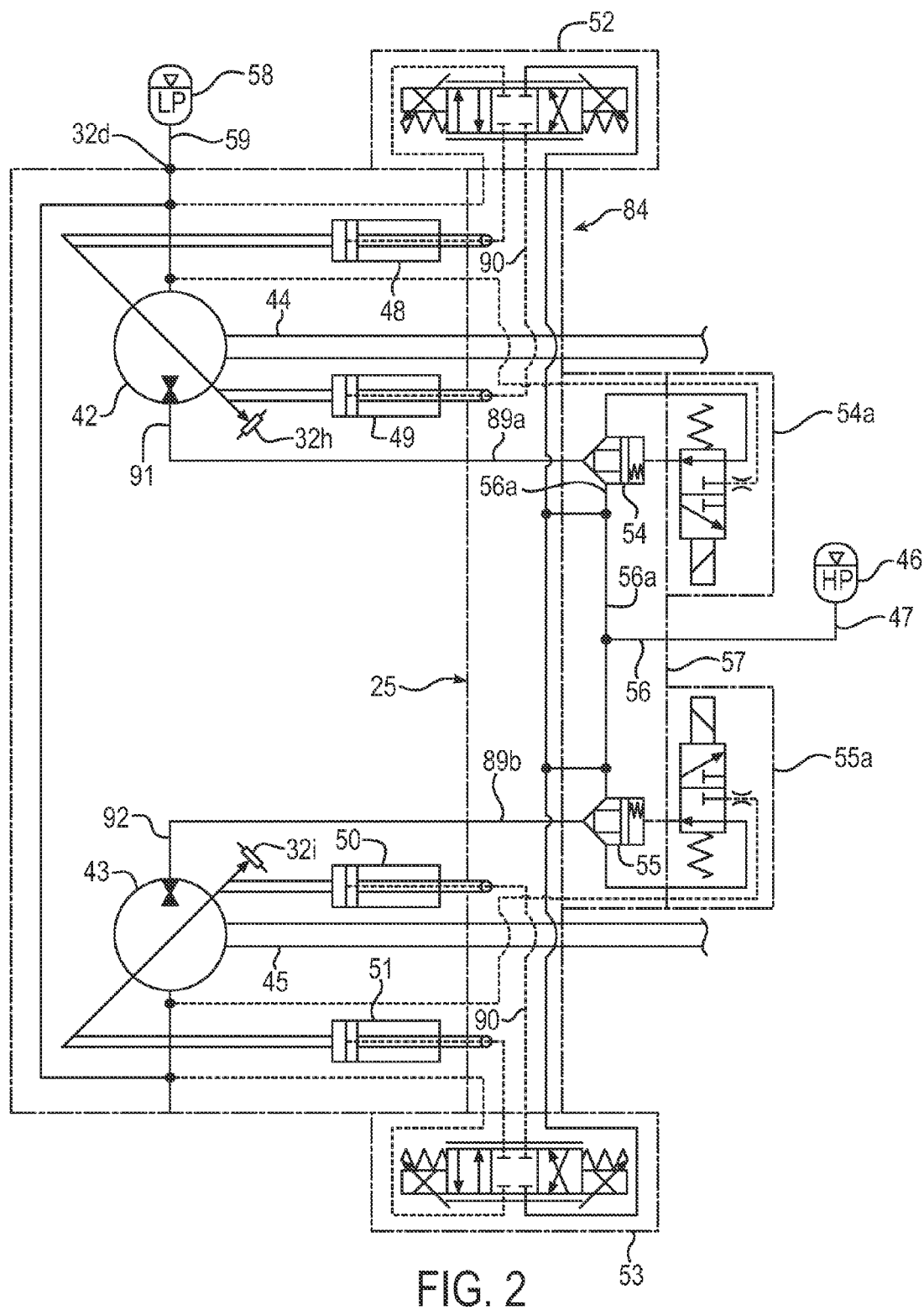
FIG. 2 is a more detailed enlarged view of a portion of the schematic diagram illustrated in FIG. 1.

FIG. 2 is an enlarged and more detailed schematic illustration of the portion of FIG. 1 illustrated by the dotted line box that surrounds the pump motor units 42 and 43 in FIG. 1. As illustrated schematically in FIG. 2 and as shown and described in detail in the above referenced publication, the displacement of primary pump motor unit 42 is controlled by a displacement control mechanism including setting or control pistons 48 and 49. Similarly, the displacement of secondary pump motor unit 43 is controlled by setting or control pistons 50 and 51. The primary pump motor unit control pistons 48 and 49 are set or controlled by electrohydraulic proportional control valve 52, and the secondary pump motor unit control pistons 48 and 49 are set or controlled by electrohydraulic proportional control valve 53. An isolation valve 54 is arranged to block or open fluid communication between primary pump motor unit 42 high pressure outlet 91 and a high pressure isolation valve port 56 connected to hydraulic line 47 leading to high pressure accumulator 46. An isolation valve 55 is arranged to block or open fluid communication between secondary pump motor unit 43 and high pressure isolation valve port 56. The isolation valves 54 and 55 are 'closed or open in response to pilot signals from electrically operated isolation pilot signal valves 54a and 55a, respectively, and the valves 54 and 55 are disposed in a single housing 57 (FIG. 10) that includes the high pressure fluid port 56 connected to high pressure line 47 leading to high pressure accumulator 46. The isolation valve housing 57 further includes passages 56a connecting the isolation valve high pressure port 56 with each of the isolation valves. As shown in FIG. 1, a low pressure reservoir 58 is connected to pump motor units 42 and 43 through low pressure hydraulic line 59 and chamber 36. A filtration and cooling pump 60 (also see FIG. 4) is driven by input shaft 41 and circulates hydraulic fluid from low pressure line 59 and chamber 36 through connections 32*a* and 32*b* to and from a hydraulic fluid filter (not shown) and a heat exchanger (not shown). Alternatively, pump 60 may be driven in any other suitable manner such as, for example, by a suitable gear set.

As best illustrated in FIGS. 1 and 7, a coupling 61 in the connecting plate 25 couples the prime mover input shaft 41 to a transfer shaft 62, so that the input shaft 41 and transfer shaft 62 rotate together as a unit. Alternatively, coupling 61 may be in any other suitable location such as, for example, outside of and on either side of the connecting plate 25. Coupling 25 is integral to the transfer shaft 62 in the preferred embodiment but may alternatively be integral to the shaft 41 or a separate component. The transfer shaft 62 extends longitudinally from connecting plate 25 into the planetary gear housing interior chamber 37, so that the transfer shaft 62 may be considered a part of and/or an extension of input shaft 41. The right end of the transfer shaft 62 is rotatably journaled or supported in a bearing 62*a* in a blind bore in the left end of a planetary gear unit output drive shaft 63 at the output end 31 of the planetary gear unit housing 29, so that the transfer shaft 62 is not drivingly coupled to the output drive shaft 63 but instead rotates relative to the output drive shaft 63. The output drive shaft 63 extends from the planetary gear unit housing interior chamber 37 longitudinally through an output drive shaft opening 63*a* in gear unit housing 29 and is connected to the differential drive shaft 17 by a coupling 64.

As illustrated schematically in FIG. 1 and described in more detail below, the gear unit or planetary gear unit 24 includes gear unit components 71 disposed within the gear unit housing interior chamber 37. The gear unit components 71 are planetary gear components, and the components 71 include a sun gear 72, a ring gear 73, planet gears 74 and a planet carrier 75. The prime mover 13 is drivingly connected to the planet carrier 75. The primary pump motor unit 42 is drivingly connected to the sun gear 72. The secondary pump motor unit 43 is drivingly connected to the ring gear 73 and to the drive wheels 15.

More specifically, as illustrated in FIGS. 1 and 7, the planet carrier 75 is drivingly connected to transfer shaft 62, preferably by a spline connection, so that transfer shaft 62 and input shaft 41 and engine drive shaft 14 and prime mover 13 are drivingly connected and rotate together. Alternatively, one or more of the several spline connections illustrated herein may be replaced with any other suitable attachment device such as, for example, a key and slot arrangement or by a single piece construction. As illustrated in FIGS. 1 and 8, primary pump motor unit drive shaft 44 extends into planetary gear unit interior chamber 37 and carries a gear 76 through a spline connection. Gear 76 drives gear 77, which drives sun gear 72 through a spline connection. As illustrated in FIGS. 1 and 9, secondary pump motor unit drive shaft 45 is drivingly connected to ring gear 73 and to output shaft 63 and differential drive shaft 17 and differential 16 and drive wheels 15, so that these components rotate together. Specifically, secondary pump motor unit drive shaft 45 extends into planetary gear unit interior chamber 37 and carries a gear 78 through a spline connection, and gear 78 meshes with gear 79 that is connected to ring gear 73 and to output shaft 63.

Referring to FIGS. 1 and 8, the primary pump motor shaft 44 extends longitudinally from the rotating axial piston group 42*a*, 42*b* of its associated primary pump motor unit 42 in interior chamber 36 of hydraulic unit 23, through the connecting plate 25, and into the interior chamber 37 of planetary gear unit 24. The left end of the primary pump motor unit shaft 44 is supported by a tapered roller bearing 80 in the connecting plate 25 to accommodate radial and axial loads on the shaft 44, and the right end of the shaft 44 is supported by a roller bearing 81 in housing 29 of planetary gear unit 24. The gear 76 that is carried by the primary pump motor unit shaft 44 is disposed intermediate the bearings 80 and 81 and adjacent the bearing 81. Similarly, as shown in FIGS. 1 and 9, the secondary pump motor shaft 45 extends longitudinally from the rotating axial piston group 43*a*, 43*b* of its associated secondary pump motor unit 43 in interior chamber 36 of hydraulic unit 23, through the connecting plate 25, and into the interior chamber 37 of planetary gear unit 24. The left end of the secondary pump motor unit shaft 45 is supported by a tapered roller bearing 82 in the connecting plate 25 to accommodate radial and axial loads, and the right end of the shaft 45 is supported by a roller bearing 83 in a blind bore 83*a* in housing 29 of planetary gear unit 24. The gear 78 that is carried by the secondary pump motor unit shaft 45 is disposed intermediate the bearings 82 and 83 and adjacent the bearing 83. This arrangement integrates the pump motor units 42 and 43 and their associated shafts 44 and 45 into the hydraulic unit 23 and the connecting plate 25 and the planetary gear unit 24 to provide an integral unit. By supporting the ends of the shafts 44 and 45 in this manner in bearings in the connecting plate 25 and planetary gear unit housing 29 and with the associated gears 76 and 78, respectively, disposed on the shafts 44 and 45 intermediate their support bearings, smaller diameter pump motor unit shaft diameters and shorter axial length pump motor unit shafts are achieved to reduce the size and weight of the transmission 11.

Referring now to FIGS. 1-2 and 7-9 to further describe the connecting plate 25, the connecting plate 25 is of high strength cast iron and the hydraulic housing 26 and planetary gear unit housing 29 are of lower strength and lower weight aluminum casting. The material for the connecting plate 25 and housings 26 and 29 may alternatively be of other suitable materials. The connecting plate 25 provides a major structural element of the transmission 11, and a connecting assembly 84 includes the connecting plate 25 and the hydraulic components and gear set components that are assembled to and carried by the connecting plate 25. The connecting plate 25 has a hydraulic unit side that includes a hydraulic unit wall 25*a* that provides a wall of hydraulic unit sealed chamber 36 adjacent the output end 28 of the hydraulic unit 23. The connecting plate 25 also has a planetary gear unit side that includes a planetary gear unit wall 25*b* that provides a wall of planetary gear unit sealed chamber 37 adjacent the input end 30 of planetary gear unit 24. A mechanical drive opening 85 (FIG. 7) extends longitudinally through the connecting plate 25 from the hydraulic side 25*a* to the gear set side 25*b*, and a bearing 86 and seal 86*a* are disposed in the opening 85. The input mechanical drive shaft 41 (including its transfer shaft 62) extends longitudinally into the opening 85 and is supported by the bearing 86*a* and sealed by the seal 86*b*. A primary hydraulic drive opening 87 (FIG. 8) extends longitudinally through the connecting plate 25 from the hydraulic side 25*a* to the gear set side 25*b*. The primary opening 87 is in laterally offset relation to the opening 85 and input shaft 41, and the primary pump motor unit shaft bearing 80 and associated seal 80*a* are disposed in the opening 87. The primary pump motor unit 42 is secured to the connecting plate 25 on its hydraulic side 25*a* and is longitudinally aligned with the opening 87. The primary pump motor unit drive shaft 44 extends longitudinally through the opening 87 and is supported by the bearing 80 and sealed by the associated seal 80*a*. A secondary hydraulic drive opening 88 (FIG. 9) extends longitudinally through the connecting plate 25 from the hydraulic side 25a to the gear set side 25b. The secondary opening 88 is also in laterally offset relation to the opening 84 and input shaft 41, and the secondary pump motor unit shaft bearing 82 and associated seal 82a are disposed in the opening 88. The secondary pump motor unit 43 is secured to the connecting plate 25 on its hydraulic side 25a and is longitudinally aligned with the opening 88. The secondary pump motor unit drive shaft 45 extends longitudinally through the opening 88 and is supported by the bearing 82 and sealed by seal 82a. The connecting assembly 84 further includes the planetary gear set 71, which is mounted on the gear set side 25b of the connecting plate 25. This configuration provides an input drive shaft 41, 62 that extends longitudinally from end to end through the sealed chamber 36 of hydraulic unit 23 and through the connecting plate 25, and primary and secondary pump motor units 42 and 43 that are each disposed in the sealed chamber 36 and are laterally offset from the drive shaft 41, 62 and circumferentially and longitudinally spaced from one another.

The connecting plate 25 of the connecting assembly 84 provides a hydraulic manifold and further includes fluid flow passages that include high pressure fluid flow passages 89a and 89b and pilot signal passages 90. The high pressure fluid outlet side of each hydraulic pump motor unit 42 and 43 includes a high pressure fluid outlet or flow tube 91 (FIGS. 1 and 8), 92 (FIGS. 1 and 9), respectively, and the flow tubes 91 and 92 are further described in the above referenced publication. The passages 89a and 89b in the connecting plate 25 connect each of the isolation valves 54, 55 with an associated one of the pump motor units, so that the flow tubes 91 and 92 are each connected in fluid communication to the isolation valves 54 and 55. The valves 52, 53, 54 and 55 are secured to and mounted on the connecting plate 25, and the pilot fluid passages 90 are in fluid communication with these valves.

In this manner, the connecting plate 25 is a component of a connecting assembly 84 and provides a mounting platform for the pump motor units 42 and 43 and for the valves 52, 53, 54, and 55; provides support and bearings for the pump motor unit shafts 44 and 45; provides bearings for the transfer shaft 62 and support for the transfer shaft 62 and input shaft 41; provides a mounting platform for the planetary gear components 71; provides a wall for the hydraulic unit internal chamber 36 and for the planetary gear unit internal chamber 37; combines the hydraulic unit 23 and the planetary gear unit 24 into an integral unit; and provides a high pressure hydraulic manifold for the fluid connections between and among the high pressure accumulator 46, valves 52, 53, 54, and 55, setting pistons 48, 49, 50 and 51, and pump motor units 42 and 43 and their associated rotating piston groups and high pressure flow tubes 91, 92. The illustrated components in the hydraulic unit 23, such as for example the pump motor units 42 and 43, may be replaced with different components and used with the gear unit 24 or with a different gear unit. Similarly, the illustrated components in the gear unit 24, such as for example the planetary gear components 71 and drive gears, may be replaced with different components and used with the hydraulic unit 23 or with a different hydraulic unit. This enables the transmission 11 to be used in a wide variety of vehicles and applications.

As best illustrated in FIG. 3, the exterior surfaces 32 and 33 of housings 26 and 29 provides several connections used for the transmission 11. For example, exterior surfaces 32 and 33 provide liquid filter and cooler supply and return ports 32a and 32b, liquid sensor temperature port 32c, auxiliary low pressure return port 32d, park pawl position sensor connection 32e, secondary pump motor unit speed sensor connection 32f, primary pump motor unit speed sensor connection 32g, primary and secondary pump motor unit displacement sensor 32h and 32i, and hydraulic unit low pressure sensor 32j.

Once the transmission 11 is assembled in the configuration illustrated in the drawings and described above, the transmission 11 is installed in the vehicle 10 in the lateral space between the frame rails 18 and in the longitudinal space between the prime mover drive shaft 14 and the differential drive shaft 17 (FIG. 1). The prime mover draft shaft 14 is connected through the torsional vibration dampening coupling 14a to the input shaft 41 of the transmission 11. The differential drive shaft 17 is connected to the output drive shaft 63 of the transmission 11 through the couplings 64a and 64b and shaft 64c. The appropriate electrical connections are made between the control systems of the vehicle 10 and the electrical components of the transmission 11, and the appropriate connections are made between the hydraulic components of the vehicle 10 (including the accumulators 46 and 47) and the transmission 11. In this installed configuration, the prime mover drive shaft 14, hydraulic unit prime mover input shaft 41, input opening 41a, transfer shaft 62, planetary gear unit output drive shaft 63, output drive shaft opening 63a, and differential drive shaft 17 are in axially aligned or coaxial relationship. All of the components of the hydraulic unit 23 including the pump motor units 42 and 43, and all of the components of the connecting plate 25 including the hydraulic manifold high pressure port 56 and passages 89 and 90 and control valves 52-55, and all of the components of the planetary gear unit 24 including the planetary gear components 71 and drive gears 76, 78 and 79, are disposed laterally between the frame rails 18 and longitudinally between the drive shafts 14 and 17. In this manner, the hydromechanical powersplit transmission 11 may be installed in the vehicle 10 in place of a conventional manual or automatic or variable transmission without substantial alteration of this space or the components of the vehicle 10 that define this space.

Turning now the operation of the transmission 11, the transmission 11 operates in various modes under a wide variety of conditions. For example, the transmission 11 operates in various modes in response to vehicle operator accelerator pedal input to transmit power from the prime mover 13 and/or from stored energy in the high pressure accumulator 46 to the differential drive shaft 17 to propel the vehicle 10. Further, the transmission 11 operates in various modes in response to vehicle operator brake pedal input to capture energy from the vehicle 10 during braking of the vehicle 10 and to transmit the captured energy to the high pressure accumulator storage device 46 for later use. Still further, the transmission 11 operates in response to vehicle operator input to start the prime mover 13 using stored energy in the accumulator storage device 46 when the vehicle 10 is stationary.

To select among a virtually infinite array of the above described operating modes of the transmission 11, the displacement and pump or motor operating mode of pump motor units 42 and 43 may be changed and the isolation valves 54 and 55 may be opened or closed. For example, when the secondary unit 43 is to be used in a pumping mode during braking to charge the accumulator 46, an input provided to the pilot valve 55a may allow the isolation valve 55 to close. In this mode of operation, the isolation valve 55 for the secondary pump motor unit 43 may act as a check valve, so that the isolation valve 55 opens when pressure in the outlet tube 92 exceeds the pressure in the high pressure accumulator 46 to allow pressure from unit 43 to charge accumulator 46. The isolation valve 54 for the primary pump motor unit 42 may be generally opened when the vehicle 10 is moving, except closed when the secondary unit 43 is pumping during braking to prevent supply of fluid from the secondary unit 43 to the primary unit 42.

When the vehicle 10 is stationary, the isolation valve 54 for the primary unit 42 may be closed, to prevent unintended flow to the secondary unit 43 and unintended movement of the vehicle 10. The transmission 11 may also be used to start the engine 13, to eliminate the need for a conventional starter. For this mode, hydraulic fluid from accumulator 46 is supplied to primary pump motor unit 42 and isolated from secondary pump motor unit 43, so that unit 43 and its drive shaft 44 rotate to rotate gears 76, 77, 72 and 74 to rotate planet carrier 75 and transfer shaft 62 and input shaft 41 and drive shaft 14 to rotate and start prime mover engine 13 (FIG. 1).

Further, the proportional control valves 52 and 53 adjust the displacement of the units 42 and 43 during both pumping and motoring modes. For example, when movement of vehicle 10 is initially started from a stopped position, fluid is supplied from accumulator 46 to secondary unit 43 and displacement of unit 43 is gradually increased to accelerate vehicle 10. As speed of the vehicle 10 increases and displacement of unit 43 increases, fluid pressure from accumulator 46 decreases and less stored energy is available to unit 43 to continue to drive vehicle 10. As the speed of the vehicle further increases, more power is transmitted mechanically directly from the engine 13 to driveshaft 17 through the planetary gearset 71, while less power is transmitted by the hydraulic pump motor units. By reducing the hydraulic power transmitted at higher vehicle speeds, the overall transmission efficiency is increased. Additionally, the displacements of pump motors 42 and 43 are steplessly adjusted to achieve a desired output shaft speed for a given input prime mover input shaft speed. The adjusting of displacement provides for an infinitely variable or stepless transmission ratio, which allows the prime mover 13 to be operated at its most efficient operating speed regardless of output shaft speed. Additionally, since there is no gear shifting, there is no interruption in power. Under this condition, displacement of units 42 and 43 may be set to zero, to minimize any drag or inefficiency caused by units 42 and 43. When vehicle 10 is to brake, secondary unit 43 is operated in a pumping mode and displacement of unit 43 is increased to pump more fluid into accumulator 46 and cause further braking resistance to the drive wheels 15 until the desired slower speed or stopped condition for the vehicle 10 is achieved. During operation of the transmission 11, the sealed hydraulic unit chamber 36 is maintained at a positive pressure of at least about 2 bar and preferably in the range of about 2 bar to about 6 bar, to prevent cavitation in the pump motor units 42 and/or 43 during pumping, while the sealed gear unit chamber 37 is maintained at about atmospheric pressure. Because the pump motor units 42 and 43 are disposed in chamber 36 which is the low pressure reservoir, separate low pressure conduits and connections between the low pressure reservoir and the pump motor units 42 and 43 are not required.

In this manner, the transmission 11 provides a hydromechanical powersplit transmission that captures and stores energy as high pressure fluid in accumulator 46 during vehicle braking and that uses that stored energy to propel the vehicle 10 or to start engine 13. Further, when the vehicle 10 is to be propelled when stored energy in accumulator 46 is depleted, a direct variable speed mechanical connection is provided from engine 14, through hydraulic unit 23 but without pumping or motoring displacement of the units 42 and 43, through the planetary gear set 71 and to the drive wheels 15.

Gear Unit Double Sump

Referring now to FIGS. 1 and 7-9, the planetary gear unit housing 29 includes a front gear unit housing 29a and a rear gear unit housing 29b. The sealed interior chamber or sump 37 of the planetary gear unit 24 includes a front chamber or front sump 37a and a rear chamber or rear sump 37b. The primary hydraulic pump motor unit drive shaft 44 extends from the hydraulic side 25a, through the connecting plate 25, to the front chamber 37a, where its associated gear 76 is drivingly connected to the sun gear 72 through gear 77 (FIGS. 1 and 8). The planetary gear components 71, including sun gear 72, ring gear 73, planet gears 74 and planet carrier 75 and the gear 76 provide a first gear set all disposed within front chamber or sump 37a. The mechanical or prime mover input shaft 41 with its transfer shaft 62 extends from the hydraulic side 25a, through the connecting plate 25, to the front sump 37a, where the transfer shaft is drivingly connected to the planet carrier 75 (FIGS. 1 and 7). The secondary hydraulic pump motor unit drive shaft 45 extends from the hydraulic side 25a, through the connecting plate 25, through the front sump 37a, to the rear sump 37b. In the rear sump 37b, the gear 78 is secured on the secondary pump motor unit drive shaft 45 and is drivingly connected to gear 79 (FIGS. 1 and 9). Gear 79 in turn is connected to output drive shaft 63 in rear chamber 37b and to ring gear 73. Gears 78 and 79 provide a second gear set disposed in the rear sump 37b.

Gear unit front housing 29a includes a longitudinally extending housing portion or wall 93 and a laterally extending generally planar housing portion or wall 94. Housing portion 94 provides a wall that separates sumps 37a and 37b and provides a common or shared wall for each sump 37a and 37b. An output drive shaft opening 95 extends longitudinally through housing portion or wall 94, and a bearing 96 in opening 95 supports output drive shaft 63. Gear unit rear housing 29b includes a longitudinally extending housing portion or wall 97 and a laterally extending generally planar housing portion or wall 98. The output drive shaft opening 63a extends longitudinally through housing portion or wall 98, and a bearing 100 in opening 63a supports output drive shaft 63.

When the motor vehicle 10 is not moving, the output shaft 63 and gears 79 and 78 and secondary pump motor unit drive shaft 45 are in a stationary condition and are not rotating. In this condition, the fluid level in the chambers or sumps 37a and 37b is approximately at a level indicated by dotted line 101a in FIGS. 7-9, which is above secondary pump motor unit gear 78 and below planetary gear components 71. The fluid in planetary gear housing 29 within sumps 37a and 37b is a suitable gear lubricating oil. Because the interior chamber or sump 37 (including 37a and 37b) of planetary gear unit 24 is sealed from the interior chamber or sump 36 of hydraulic unit 23, the fluid in sump 37 of planetary gear housing 29 can be a different fluid than in sump 36 of hydraulic unit housing 26 and can be at a different fluid pressure level. Further, as discussed in greater detail below, while the fluid level within the hydraulic unit housing 26 is substantially at the top of hydraulic unit sump 36 at level 101b (FIG. 8) to permit sump 36 to provide a hydraulic fluid reservoir and to permit exchange and flow of hydraulic fluid from a motoring one of pump motor units 42, 43 to a pumping one of the units, the fluid level within planetary gear unit sump 37 is at a different and lower level to avoid heat build-up that would occur if the fluid levels were the same and the planetary gear components 71 and gears in the planetary gear unit housing 37 were submerged in lubricating fluid.

Figure 11:
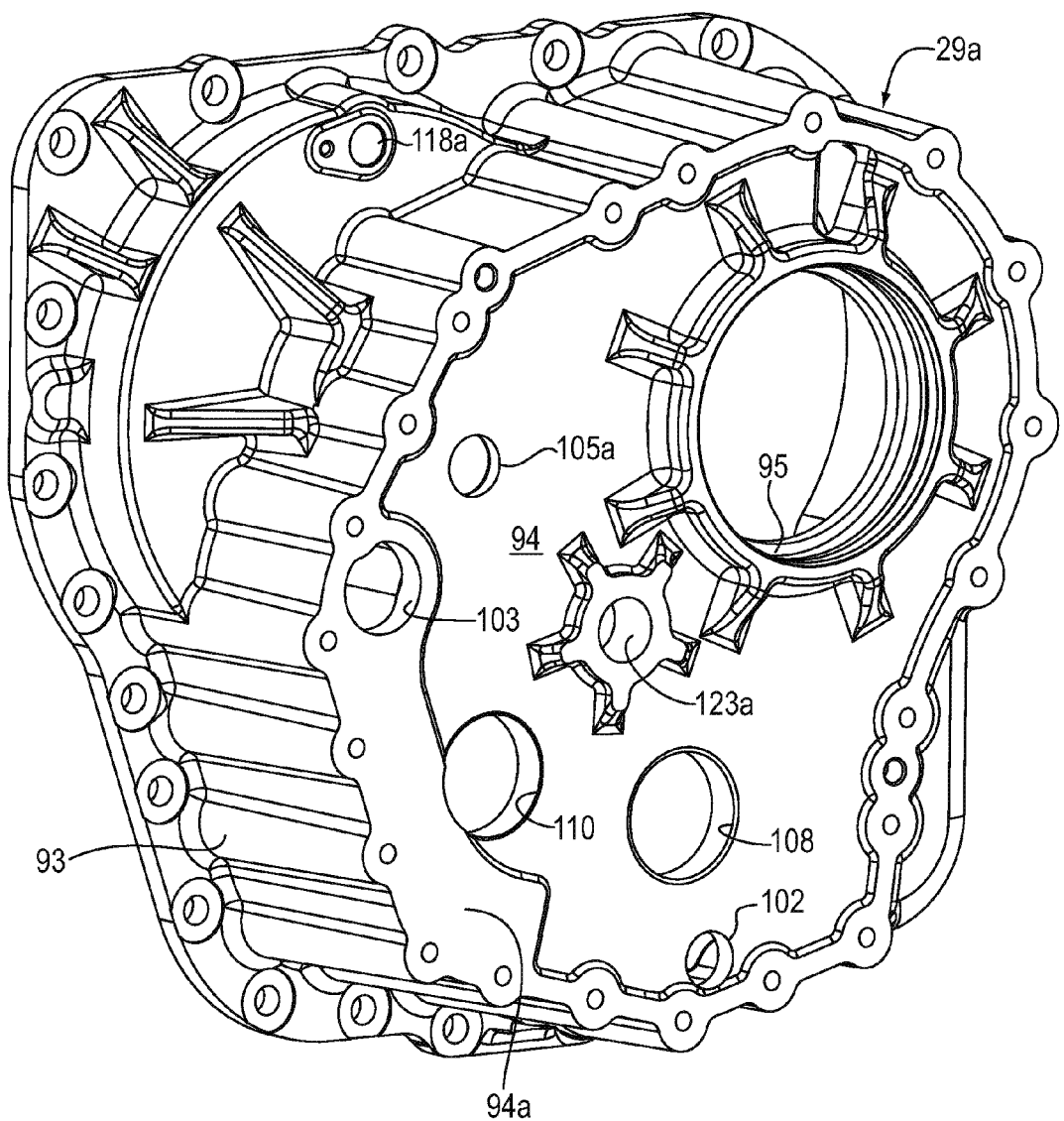
FIG. 11 is a perspective view of a front planetary gear unit housing for the planetary gear unit of the transmission illustrated in FIG. 1, as viewed from the rear driver side of the vehicle in which the transmission is installed, and with all associated components removed for clarity.
Figure 12:
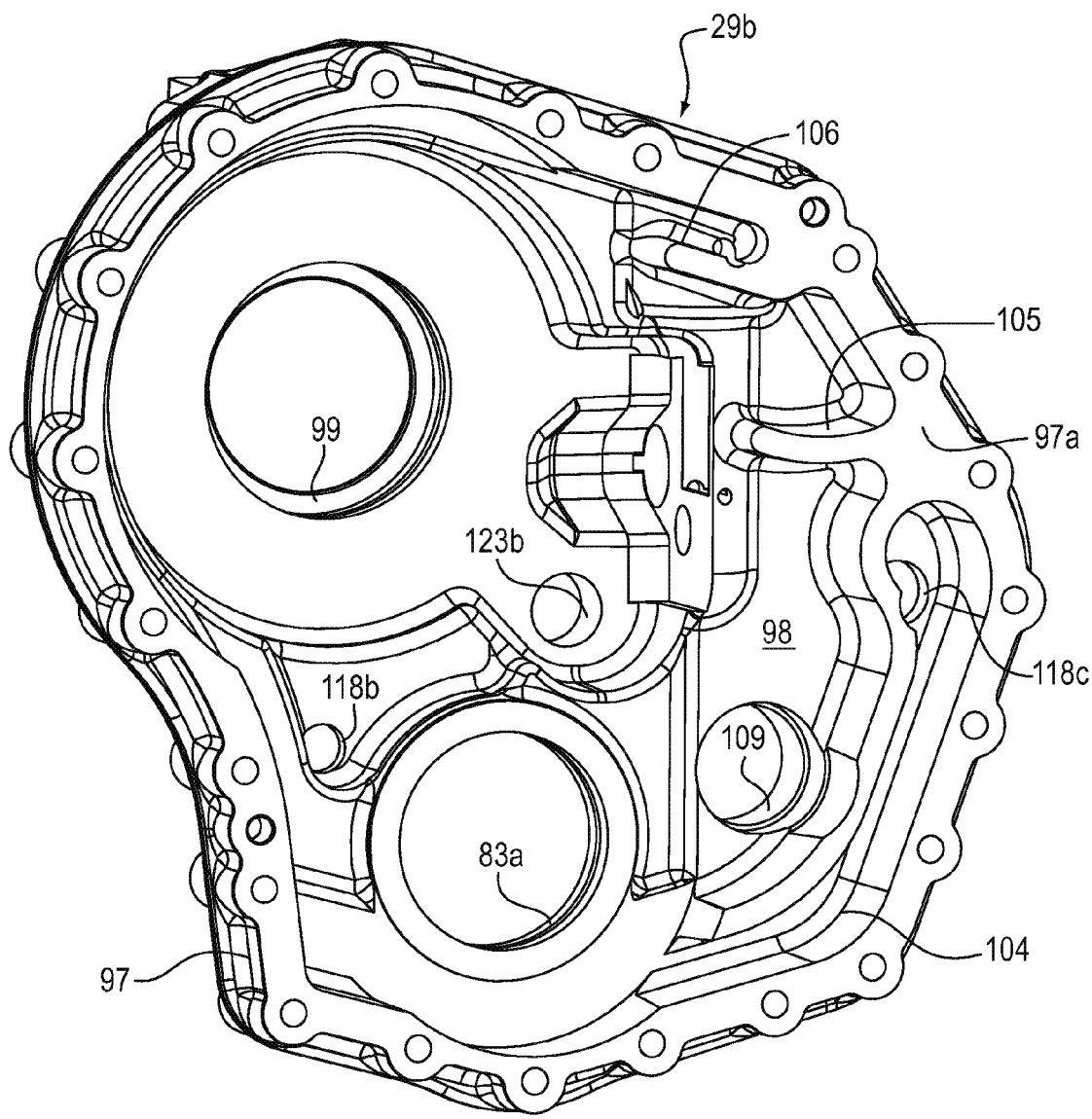
FIG. 12 is a perspective view of a rear planetary gear unit housing for the planetary gear unit of the transmission illustrated in FIG. 1, as viewed from the front passenger side of the vehicle in which the transmission is installed, and with all associated components removed for clarity.
Figure 13:
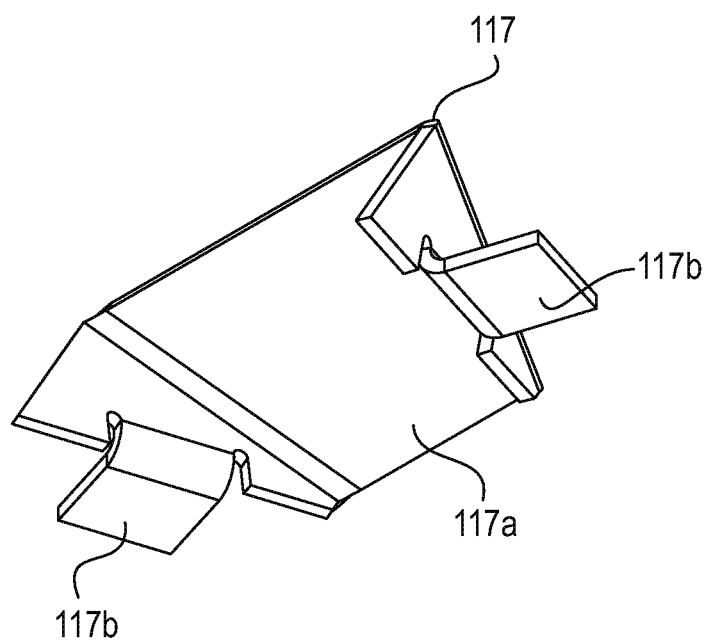
FIG. 13 is an enlarged perspective view of a lubricating liquid baffle or trough for the planetary gear unit of the transmission illustrated in FIG. 1.

Referring now to FIGS. 11 and 12, a rear facing generally planar surface 94a of the front planetary gear housing 29a is illustrated in FIG. 11 and a mating front facing generally planar surface 97a of rear planetary gear housing 29b is illustrated in FIG. 12. For clarity, the housings 29a and 29b and their respective mating surfaces 94a and 97a are illustrated in FIGS. 11 and 12 without any other components. A restricted size return opening or fluid passage 102 extends longitudinally through wall 94 at a location vertically below level 101a to connect sumps 37a and 37b, and a larger size pump opening or fluid passage 103 extends longitudinally through wall 94 at a location vertically above level 101a to connect sumps 37a and 37b. The surface 98a includes a generally U-shaped longitudinally recessed pump channel 104. When housings 29a and 29b are assembled as shown in FIGS. 7-9, the rear facing surface 94a of housing 29a engages the front facing surface 97a of housing 29b. In this assembled configuration, surface 97a provides a wall to close pump channel 104, and closed pump channel 104 extends between and establishes fluid communication between openings 102 and 103. The front housing 29a also includes an opening 118a that may be used for mounting a speed sensor (not shown) for primary pump motor unit 42, and the rear housing 29b also includes an opening 118b that may be used for mounting a speed sensor (not shown) for secondary pump motor unit 43. An oil fill hole 118c is provided in the rear housing 29b to fill the sumps 37a and 37b with lubricating oil.

Figure 14:
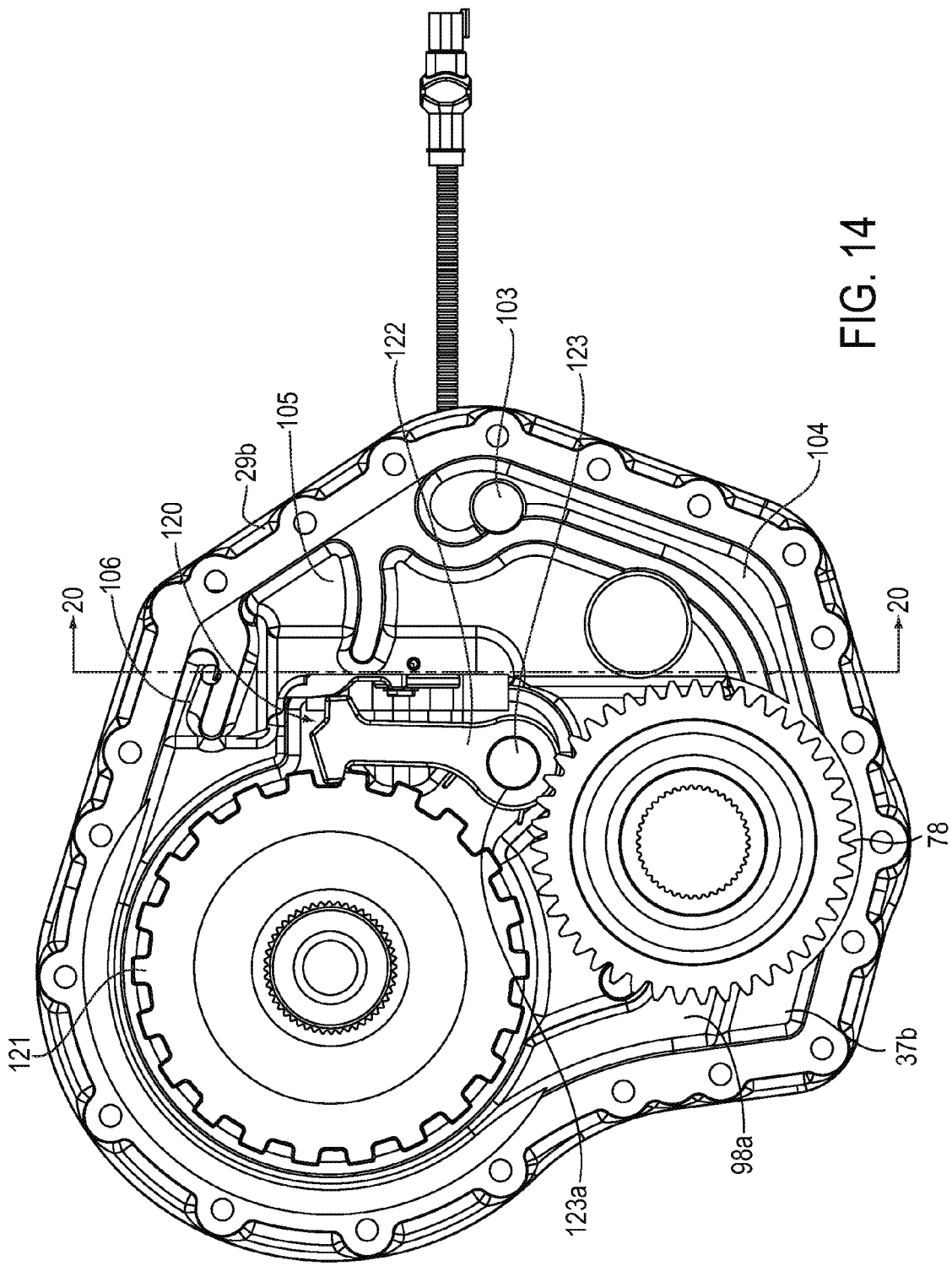
FIG. 14 is an elevation view of the rear planetary gear unit housing illustrated in FIG. 12, with some associated components installed and other associated components removed for clarity, as viewed from the front of the vehicle in which the transmission is installed, illustrating a park pawl assembly for the transmission illustrated in FIG. 1.

As illustrated in FIG. 14, rotation of gear 78 near the bottom of chamber or sump 37b causes gear 78 to throw or pump fluid from return opening 102 (FIG. 11) near the bottom of chamber or sump 37b upward through channel 104 (FIG. 12) to pump passage 103. Passage 103 connects rear chamber or sump 37b to front chamber or sump 37a on the front side of housing 29b. This oil from channel 104 flowing through passage 103 will then fall onto the primary gear 76 in front sump 37a to increase oil splash lubrication in front sump 37a. Fluid flows faster from rear sump 37b to front sump 37a through passage 103 than it can return from front sump 37a to rear sump 37b through passage 102, and this results in the fluid level in sump 37b being substantially at the level of the bottom of gear 78 when the gear 78 is rotating. This prevents the gear 78 from rotating at high speeds or for long periods of time submerged in oil, and prevents heat build-up that would otherwise occur if the gear 78 were to run submerged in oil. When the vehicle 10 is moving, the output shaft 63 and gears 79 and 78 and secondary pump motor unit drive shaft 45 are rotating and this pumping from sump 37b to sump 37a through channel 104 occurs. When the vehicle 10 stops moving and the gear 78 stops rotating, fluid returns from front sump 37a to rear sump 37b through passage 102 and the fluid level in sumps 37a and 37b returns to level 101a. The volume of liquid lubricant in the rear sump 37b is substantially less than, and preferably no greater than about 30% of, the volume of lubricant in the front sump 37a when the second gear set is in its stationary condition. This relatively small volume of lubricant in the rear sump relative to that in the front sump allows transferring most of the lubricant from the rear sump to the front sump during gear rotation, so that the transferred volume does not fill the front sump to too high a level.

As illustrated in FIGS. 12 and 14, surface 98a of rear housing portion 29b also includes longitudinally extending ledges 105 and 106. When gear 78 rotates, gear 78 also splashes lubricating oil onto ledges 105 and 106. Oil on ledge 105 flows into front sump 37a through opening 105a (FIG. 11) and onto rear primary bearing 81 (FIG. 8). Oil on ledge 106 is directed to the park pawl assembly 120 described below through a vertical hole at the right end of ledge 105 as viewed in FIG. 12. Accordingly, lubricating oil from rear sump 37b is pumped to front sump 37a to reduce the fluid level in rear sump 37b, and lubricating oil in the rear sump 37b is distributed to the moving components and bearings within the sumps 37a and 37b. This pumping and distribution is accomplished using the secondary gear 78 and the openings and channels and ledges described above, to eliminate the need for a conventional lubrication pump and to minimize the size and weight and complexity of the transmission 11.

As illustrated in FIGS. 9 and 11, the front housing 29a of the gear unit 24 also includes a secondary pump motor shaft opening 108, and the secondary pump motor shaft 45 extends through opening 108. As illustrated in FIGS. 8, 11 and 12, the housing 29a also includes a low pressure return line opening 109, and the housing 29b includes a low pressure return line opening 110. The opening 110 is used to optionally connect a low pressure accumulator to chamber 36 and is not used in the preferred embodiment illustrated in the drawings. A low pressure return tube 111 extends through and is sealed within openings 109 and 110, to connect low pressure hydraulic reservoir or sump 36 through sump 37a and 37b to opening 110.

Accordingly, the walls 93 and 94 of the front or first housing 29a define the front or first sump 37a. The rear or second housing 29b is connected to the first housing 29a and includes walls 97 and 98 that cooperate with the common wall 94 of the first housing 29a to define the rear or second sump 37b. A first set of rotatable gears 71 is disposed in the first sump 37a and has a stationary condition and a rotating condition. A second set of rotatable gears 78, 79 is disposed in the second sump 37b and has a stationary condition and a rotating condition. An input drive shaft 62 extends longitudinally into the first sump 37a and is rotatably connected to the first set of rotatable gears. An output drive shaft 63 extends longitudinally out of the second sump 37b and is rotatably connected to the second set of gears. The longitudinal axes 22 of the input and output drive shafts are substantially coaxial. A first hydraulic pump motor unit drive shaft 44 extends into the first sump 37a and is driving connected with the first set of rotatable gears. A second hydraulic pump motor unit drive shaft 45 extends longitudinally from end to end through the first sump 37a and into the second sump 37b and is drivingly connected with the second set of rotatable gears. The first and second hydraulic pump motor unit drive shafts are supported by bearings in walls 25, 94 and 98. Openings 102 and 103 extend between and establish a fluid flow path between the first sump 37a and the second sump 37b, and the openings 102 and 103 extend to the channel 104 to pump lubricating liquid from the second sump 37b to the first sump 37a when the second set of gears is rotating.

Figure 15:
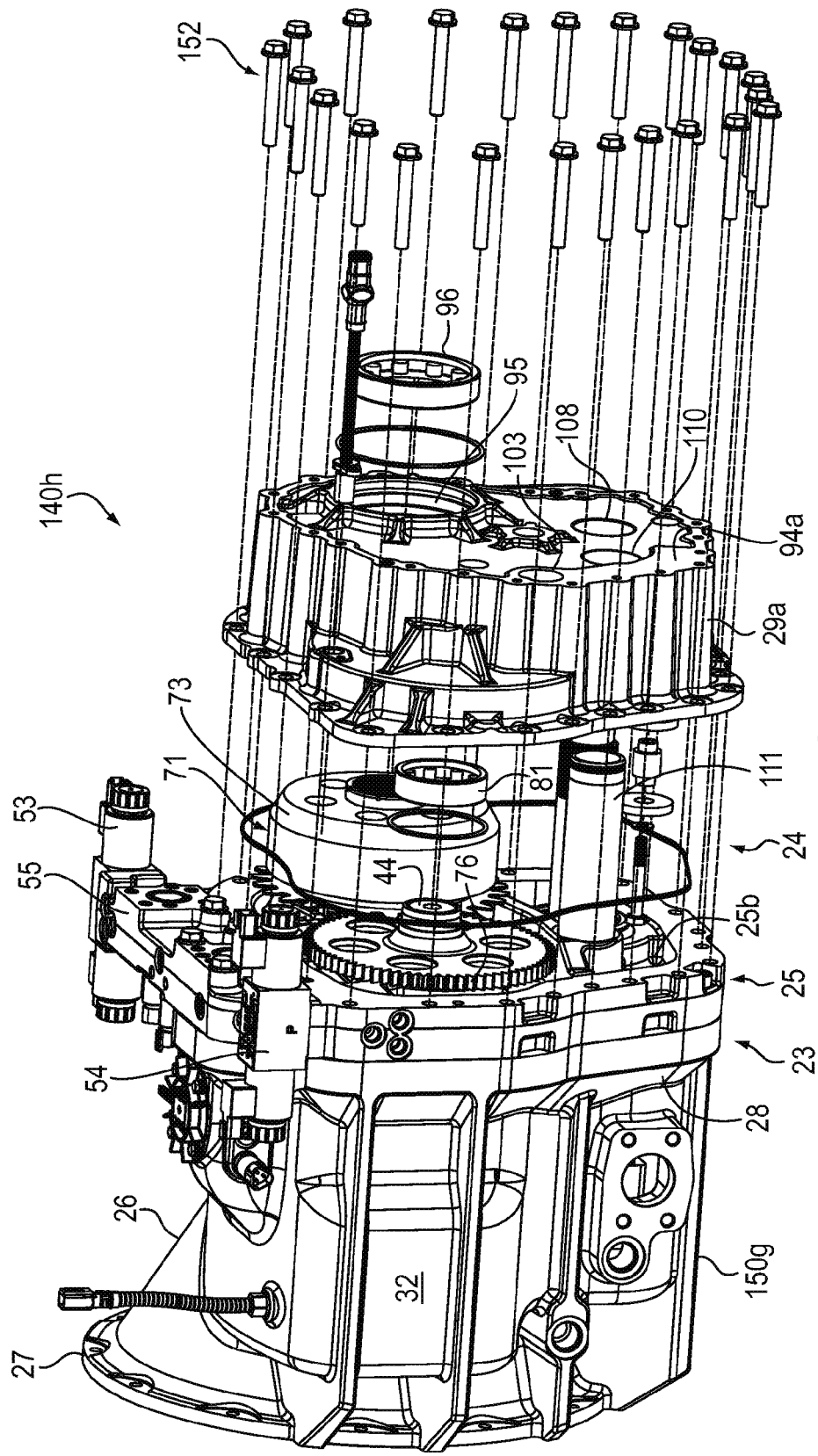
FIG. 15 is an exploded perspective view illustrating a step in the method of assembling the transmission illustrated in FIG. 1 and a subassembly of the transmission, as viewed from the driver side rear of the vehicle in which the transmission is assembled.

The front housing 29a is assembled onto a subassembly 150g of transmission 11 by an assembly step 140h illustrated in FIG. 15. The step 140h includes providing the connecting plate 25 and connecting plate assembly 150g, front planetary gear housing 29a, and bearing 96. The front planetary gear housing 29a is assembled longitudinally onto the connecting plate 25, encapsulating the gear set 71, 72, 73. The step 140h includes assembling the pump motor unit shaft 44 into bearing 81. The step 140h also includes sealing housing 29a against the planetary gear side 25b of connecting plate 25 to provide the sealed chamber or sump 37a. The bearing 96 is assembled into opening 95 in housing 29a. Assembly bolts 152 pass longitudinally through aligned holes in front planetary gear housing 29a, connecting plate 25 and housing 26, and nuts (not shown) are threaded to the ends of bolts 152 to secure housings 29a and 26 to connecting plate 25. Once the bolts 152 are assembled and tightened, temporary assembly bolts (not shown) that hold hydraulic housing 26 on connecting plate 25 pending assembly of front planetary gear housing 29a are no longer needed but are left in place and are prevented from falling out by the housing 29a covering the temporary bolts.

Figure 16:
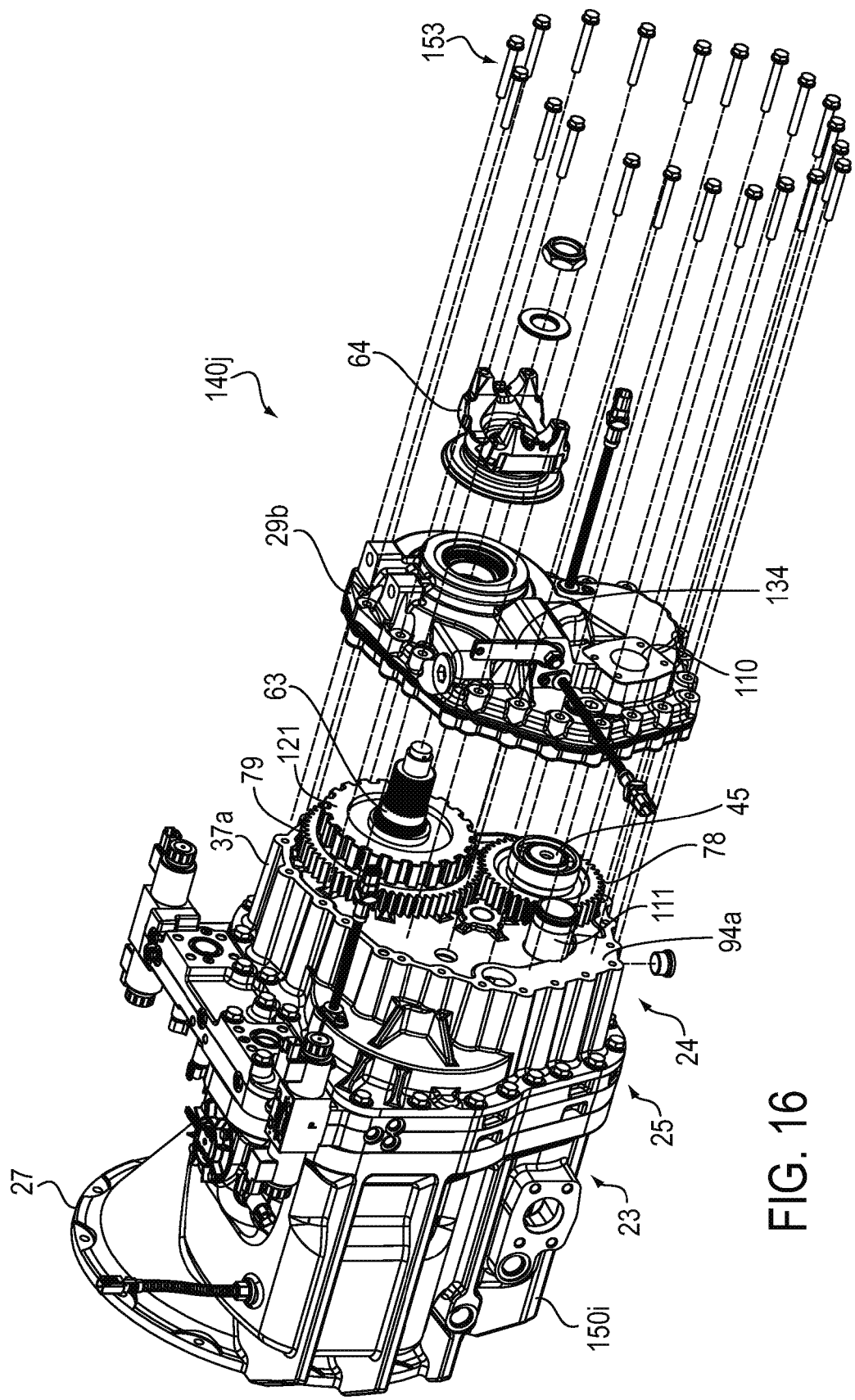
FIG. 16 is an exploded perspective view illustrating another step in the method of assembling the transmission illustrated in FIG. 1 and another subassembly of the transmission, as viewed from the driver side rear of the vehicle in which the transmission is assembled.

Next, to provide the subassembly 150i illustrated in FIG. 16, the output drive shaft 63 and bearing 63a (see FIG. 16) are assembled longitudinally into drive shaft opening 95 in aligned relationship with transfer shaft 62, and gears 79 and 121 are longitudinally assembled onto output drive shaft 63. Also, secondary pump motor unit drive gear 78 is longitudinally assembled onto secondary pump motor unit drive shaft 45. This provides the subassembly 150i illustrated in FIG. 16.

The rear housing 29b is assembled onto subassembly 150i of transmission 11 by an assembly step 140j illustrated in FIG. 16, which results in the completed transmission 11 illustrated in FIGS. 1-3. The method step 140j includes providing the connecting plate 25 and connecting plate assembly 150i, rear planetary gear housing 29b, and coupling 64. The rear planetary gear housing 29b is assembled longitudinally onto the front planetary gear housing 29a and connecting plate 25, encapsulating gear set 78, 79, 121. The step 140j includes assembling the pump motor unit shaft 45 into bearing 83. The method step 140j also includes sealing the rear planetary gear housing 29b against the front planetary gear housing 29a to provide the sealed chamber or sump 37b (FIG. 7) and to provide the channel 102 (FIGS. 12 and 14). Assembly bolts 153 pass longitudinally through aligned holes in rear planetary gear housing 29b and are threaded into aligned threaded holes in the front planetary gear housing 29a. The bolts 153 and this step secure the hydraulic unit housing 26 and the front gear unit housing 29a and the rear gear unit housing 29b and the connector plate 25 together. The coupling 64 is then longitudinally assembled onto output drive shaft 63. Once the components are assembled in this manner at step 140j, the assembly of the housings 29a and 29b and the assembly of the transmission 11 is complete.

CONCLUSION

The principles, embodiments and operation of the present invention are described in detail herein with reference to the accompanying drawings but are not to be construed as being limited to the particular illustrative forms disclosed. It will thus become apparent to those skilled in the art that various modifications of the principles, embodiments and operation herein can be made without departing from the spirit or scope of the invention.

The invention claimed is:

1. A hydromechanical transmission comprising:
    a first gear unit housing and a second gear unit housing, each of the housings having walls, the walls of the first and second housings being connected together, the walls of the first housing defining a first sump, the walls of the second housing defining a second sump,
    a first set of rotatable gears disposed in the first sump,
    a second set of rotatable gears disposed in the second sump, each of the sets of rotatable gears including at least two gears,
    an input drive shaft extending longitudinally into the first sump and being rotatably connected to the first set of rotatable gears,
    an output drive shaft extending longitudinally out of the second sump and being rotatably connected to the second set of gears,
    first and second hydraulic pump motor unit drive shafts which extend longitudinally into the first sump,
    wherein the longitudinal axes of the input and output drive shafts are substantially coaxial,
    the first hydraulic pump motor unit drive shaft extends longitudinally into and through the first sump and into the second sump and is rotatably supported by a bearing in a wall of the first sump, and
    a first gear of the second set of gears is rotatably connected to the first hydraulic pump motor unit drive shaft, and a second gear of the second set of gears is rotatably connected to the output drive shaft, the said first and second gears drivingly engaging one another.

2. A hydromechanical transmission as set forth in claim 1, in which at least one wall of the first and second housings is a common wall that defines the first sump and the second sump, the common wall including a hydraulic pump motor unit opening, and the second hydraulic pump motor unit drive shaft extending through the opening.

3. A hydromechanical transmission as set forth in claim 1, in which the second hydraulic pump motor unit drive shaft extends longitudinally through the first sump and into the second sump.

4. A hydromechanical transmission as set forth in claim 1, in which the second hydraulic pump motor unit drive shaft is rotatably supported by a bearing in a wall of the first sump and by a bearing in a wall of the second sump.

5. A hydromechanical transmission as set forth in claim 1, in which the first hydraulic pump motor unit drive shaft is driving connected to the first set of rotatable gears in the first sump, and the second hydraulic pump motor unit drive shaft is drivingly connected to the second set of rotatable gears in the second sump.

6. A hydromechanical transmission as set forth in claim 1, in which the first set of rotatable gears includes planetary gear components disposed in the first sump, the first mentioned input drive shaft is rotatably connected to one of the planetary gear components, and the output drive shaft is rotatably connected to another of the planetary gear components.

7. A hydromechanical transmission as set forth in claim 6, in which the output drive shaft extends longitudinally from the planetary gear components in the first sump through the second sump.

8. A hydromechanical transmission as set forth in claim 6, in which:
    the first hydraulic pump motor unit drive shaft is rotatably connected to another of the planetary gear components,
    at least one wall of the first and second housings is a common wall that defines the first sump and the second sump,
    the longitudinal axes of the input shaft and output shaft extend through the common wall, and the longitudinal axes of the pump motor unit drive shafts are laterally offset relative to the longitudinal axes of the input and output shafts, the longitudinally aligned shaft openings in the common wall and in other walls of the first and second sumps, and the input shaft and output shaft, extend through the shaft openings, and bearings are provided in the shaft openings which support the input shaft and the output shaft.

9. A hydromechanical transmission as set forth in claim 1, in which the second hydraulic pump motor unit drive shaft is supported by a bearing in a wall of the first sump and by a bearing in a wall of the second sump.

10. A hydromechanical transmission as set forth in claim 1, which includes:
a hydraulic unit housing connected to the first gear unit housing,
a prime mover drive shaft extending longitudinally into the hydraulic unit housing, the longitudinal axis of the prime mover drive shaft being coaxial with the input shaft and the output shaft.

11. A hydromechanical transmission as set forth in claim 10, including first and second hydraulic pump motor units disposed in the hydraulic unit housing.

12. A hydromechanical transmission as set forth in claim 8, in which the first set of rotatable gears has a stationary condition and a rotating condition, the second set of rotatable gears has a stationary condition and a rotating condition, at least one opening extends through the common wall and establishes a fluid flow path between the first sump and the second sump, the first sump is partially filled with a liquid lubricant to a predetermined first sump fill level, the second sump is partially filled with a liquid lubricant to a second sump predetermined fill level, the first and second sump fill levels are substantially the same when the second rotatable gear set is in its stationary condition, and the second sump fill level is substantially vertically beneath the first sump fill level when the second rotatable gear set is in its rotating condition.

13. A hydromechanical transmission as set forth in claim 12, in which the first sump has a volume of liquid lubricant, the second sump has a volume of liquid lubricant, and the volume of liquid lubricant in the second sump is no greater than about 30 percent of the volume of liquid lubricant in the first sump when the second gear set is in its stationary condition.

14. A hydromechanical transmission as set forth in claim 12, in which:
at least two openings extend between and establish a fluid flow path between the first sump and the second sump, the openings being in the common wall,
a channel provides a fluid flow path between the openings, one of the rotatable gears of the second set of gears being disposed adjacent the channel, and
rotation of the one of the rotatable gears when the second gear set is in its rotating condition pumps fluid through the channel between the first and second openings.

15. A hydromechanical transmission as set forth in claim 1, including at least one longitudinally extending ledge in the second sump, a wall of the first housing having an opening formed in it which extends longitudinally between the first sump and the second sump, the ledge being adjacent the opening, arranged so that rotation of a gear in the second sump splashes liquid lubricant on to the ledge so that liquid lubricant flows from the ledge through the other opening and into the first sump.

16. A hydromechanical transmission as set forth in claim 15, including bearings in the shaft openings supporting the input shaft and the output shaft.

17. A hydromechanical transmission comprising:
a first gear unit housing and a second gear unit housing, each of the housings having walls, the walls of the first and second housings being connected together, the walls of the first housing defining a first sump, the walls of the second housing defining a second sump,
a first set of rotatable gears disposed in the first sump,
a second set of rotatable gears disposed in the second sump, each of the sets of rotatable gears including at least two gears,
an input drive shaft extending longitudinally into the first sump and being rotatably connected to the first set of rotatable gears,
an output drive shaft extending longitudinally out of the second sump and being rotatably connected to the second set of gears,
first and second hydraulic pump motor unit drive shafts which extend longitudinally into the first sump,
wherein the longitudinal axes of the input and output drive shafts are substantially coaxial,
the first hydraulic pump motor unit drive shaft extends longitudinally into and through the first sump and into the second sump and is rotatably supported by a bearing in a wall of the first sump,
a first gear of the second set of gears is rotatably connected to the first hydraulic pump motor unit drive shaft, and a second gear of the second set of gears is rotatably connected to the output drive shaft, the said first and second gears drivingly engaging one another, and
at least one wall of the first and second housings is a common wall that defines the first sump and the second sump, the common wall including a hydraulic pump motor unit opening, and the second hydraulic pump motor unit drive shaft extending through the opening.

18. A hydromechanical transmission as set forth in claim 17, which includes:
a hydraulic unit housing connected to the first gear unit housing,
a prime mover drive shaft extending longitudinally into the hydraulic unit housing, the longitudinal axis of the prime mover drive shaft being coaxial with the input shaft and the output shaft.

19. A hydromechanical transmission as set forth in claim 18, including first and second hydraulic pump motor units disposed in the hydraulic unit housing.

20. A hydromechanical transmission comprising:
a first gear unit housing and a second gear unit housing, each of the housings having walls, the walls of the first and second housings being connected together, the walls of the first housing defining a first sump, the walls of the second housing defining a second sump,
a first set of rotatable gears disposed in the first sump,
a second set of rotatable gears disposed in the second sump, each of the sets of rotatable gears including at least two gears,
an input drive shaft extending longitudinally into the first sump and being rotatably connected to the first set of rotatable gears,
an output drive shaft extending longitudinally out of the second sump and being rotatably connected to the second set of gears,
first and second hydraulic pump motor unit drive shafts which extend longitudinally into the first sump,
the first hydraulic pump motor unit drive shaft extends longitudinally into and through the first sump and into the second sump and is rotatably supported by a bearing in a wall of the first sump, a first gear of the second set of gears is rotatably connected to the first hydraulic pump motor unit drive shaft, and a second gear of the second set of gears is rotatably connected to the output drive shaft, the said first and second gears drivingly engaging one another, the second hydraulic pump motor unit drive shaft extends longitudinally through the first sump and into the second sump, and at least one wall of the first and second housings is a common wall that defines the first sump and the second sump, the common wall including a hydraulic pump motor unit opening, and the second hydraulic pump motor unit drive shaft extending through the opening.

* * * * *